(12) United States Patent
Takimoto et al.

(10) Patent No.: US 11,348,350 B2
(45) Date of Patent: May 31, 2022

(54) OBSERVATION SYSTEM AND INFORMATION MANAGEMENT METHOD

(71) Applicant: OLYMPUS CORPORATION, Tokyo (JP)

(72) Inventors: Shinichi Takimoto, Hachioji (JP); Yohei Tanikawa, Hino (JP); Taiji Mine, Machida (JP); Takayuki Nakatomi, Chofu (JP); Masakazu Fujii, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/785,714

(22) Filed: Feb. 10, 2020

(65) Prior Publication Data
US 2020/0175254 A1    Jun. 4, 2020

Related U.S. Application Data

(63) Continuation of application No. PCT/JP2017/029155, filed on Aug. 10, 2017.

(51) Int. Cl.
*G06V 20/69* (2022.01)
*G06F 16/78* (2019.01)
*G06V 10/25* (2022.01)

(52) U.S. Cl.
CPC ........ *G06V 20/693* (2022.01); *G06F 16/7867* (2019.01); *G06V 10/25* (2022.01)

(58) Field of Classification Search
CPC ........... G06K 9/00261; G06K 9/00221; G06K 9/00255; A61M 16/06; A61M 2205/6063; A61M 2205/609; A61M 2205/52; A61M 2016/0661; G06T 7/0012; G06T 7/593; H04N 13/239; H04N 5/2252;
(Continued)

(56) References Cited

U.S. PATENT DOCUMENTS

| | | | |
|---|---|---|---|
| 2008/0184168 A1* | 7/2008 | Oda | G16H 30/20 715/838 |
| 2010/0208960 A1* | 8/2010 | Kiyota | C12M 41/48 382/128 |

(Continued)

FOREIGN PATENT DOCUMENTS

| | | |
|---|---|---|
| JP | 2002-085054 A | 3/2002 |
| JP | 2005-141513 A | 6/2005 |

(Continued)

OTHER PUBLICATIONS

International Search Report dated Oct. 31, 2017 issued in PCT/JP2017/029155.

(Continued)

*Primary Examiner* — Amandeep Saini
(74) *Attorney, Agent, or Firm* — Scully, Scott, Murphy & Presser, P.C.

(57) ABSTRACT

An observation system includes a processor. The processor manages a plurality of images acquired in time series with respect to a biological sample which is being cultured, records a first comment and a first region of interest (RoI) in a storage device in association with the images based on user's instructions, and records a second comment and a second ROI in the storage device in association with the first comment based on user's instructions.

18 Claims, 18 Drawing Sheets

(58) Field of Classification Search
CPC .. H04N 5/2259; A61B 5/0064; A61B 5/1079; A61B 5/1077; G03B 17/17; G03B 17/565; G02B 26/0816; G06V 20/693; G06V 10/25; G06V 10/56; G06V 20/69; G06V 20/62; G06V 20/66; G06F 16/7867; G06Q 50/10
USPC .................................................. 382/118, 128
See application file for complete search history.

(56) References Cited

U.S. PATENT DOCUMENTS

| | | | |
|---|---|---|---|
| 2016/0071547 A1* | 3/2016 | Sugawara | A61B 6/468 386/241 |
| 2017/0091413 A1 | 3/2017 | Kondo et al. | |
| 2017/0128037 A1 | 5/2017 | Mori et al. | |

FOREIGN PATENT DOCUMENTS

| | | |
|---|---|---|
| JP | 2007-233841 A | 9/2007 |
| JP | 2008-119146 A | 5/2008 |
| JP | 2009-162708 A | 7/2009 |
| JP | 2011-181137 A | 9/2011 |
| JP | 2012-186834 A | 9/2012 |
| JP | 2013-238992 A | 11/2013 |
| JP | 2014-210134 A | 11/2014 |
| JP | 2017-068838 A | 4/2017 |
| JP | 2017-084028 A | 5/2017 |
| JP | 2017-086896 A | 5/2017 |
| WO | WO2009/031283 A1 | 3/2009 |

OTHER PUBLICATIONS

English translation of International Preliminary Report on Patentability dated Feb. 20, 2020, together with the Written Opinion received in related International Application No. PCT/JP2017/029155.
Japanese Office Action dated Feb. 16, 2021 received in 2019-535547.
Japanese Office Action dated Oct. 26, 2021 received in 2019-535547.
Japanese Office Action dated Mar. 4, 2022 received in 2019-535547.

* cited by examiner

OBSERVATION SYSTEM AND INFORMATION MANAGEMENT METHOD

CROSS-REFERENCE TO RELATED APPLICATIONS

This application is a Continuation Application of PCT Application No. PCT/JP2017/029155, filed Aug. 10, 2017, the entire contents of which are incorporated herein by reference.

FIELD

Embodiments described herein relate generally to an observation system and an information management method.

BACKGROUND

Cell culture is performed in a large number of biology-related experiments. The cell culture is done based on a routine protocol, but cells often vary in the process of culture. To grasp the states of cells always accurately is therefore important in maintaining the quality of the cells. Workers engaged in cell culture therefore observe the cultured cells under a microscope to check the states of the cells every day. Work to observe the states of the cells is routine work. In this work, for example, various determinations regarding culture, including grasping of the states of cells, are often based on workers' experience or know-how. It is rare for workers to take images of the states of cells at all times and store them as image data because cell culture is always performed. Even though the images are taken, it becomes very burdensome to the workers to organize and manage the images properly because the number of images is enormous. In addition, the images are printed and attached to a laboratory notebook on which worker's comments and the like may be written. This recording method is further burdensome to the workers. For this reason, the foregoing determinations regarding culture are increasingly based on the workers' experience or know-how.

For example, Jpn. Pat. Appin. KOKAI Publication No. 2002-85054 discloses a technology for culture equipment with an observation device, which is capable of remotely observing and recording the states of cells cultured in an incubator. The culture equipment can record the state of a petri dish in the culture equipment using a scanner in the culture equipment. The equipment can record them continuously or periodically in accordance with a preset schedule. The culture equipment with an observation device can record the number of colonies and the states thereof.

SUMMARY

According to a first aspect, an observation system comprises a processor. The processor manages a plurality of images acquired in time series with respect to a biological sample which is being cultured, records a first comment and a first region of interest (RoI) in a storage device in association with the images based on user's instructions, and records a second comment and a second ROI in the storage device in association with the first comment based on user's instructions.

According to a second aspect, an information management method comprises managing a plurality of images acquired in time series with respect to a biological sample which is being cultured, recording a first comment and a first region of interest (RoI) in a storage device in association with the images based on user's instructions, and recording a second comment and a second ROI in the storage device in association with the first comment based on user's instructions.

Advantages of the embodiments will be set forth in the description which follows, and in part will be obvious from the description, or may be learned. The advantages may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments, and together with the general description given above and the detailed description of the embodiments given below, serve to explain the principles.

DETAILED DESCRIPTION

Embodiments will be described with reference to the drawings. The embodiments relate to an observation system for use in observation of a biological sample such as a cell, which is being cultured. The observation system allows, for example, a biological sample in an incubator to be imaged. Cells to be observed and the like may be derived from whatever living thing and cultured by whatever method. In this observation system, an image acquired by imaging can be stored in a server and browsed from a plurality of terminals. Furthermore, in the observation system, for example, comments regarding an image, such as a text and a region of interest (RoI), can be attached to the image. Since, for example, comments can be attached to an image from a plurality of terminals and an image with comments can be browsed therefrom, information on the image can be shared among a plurality of users and opinions can be exchanged among them.

[Configuration of Imaging System]

Figure 1:
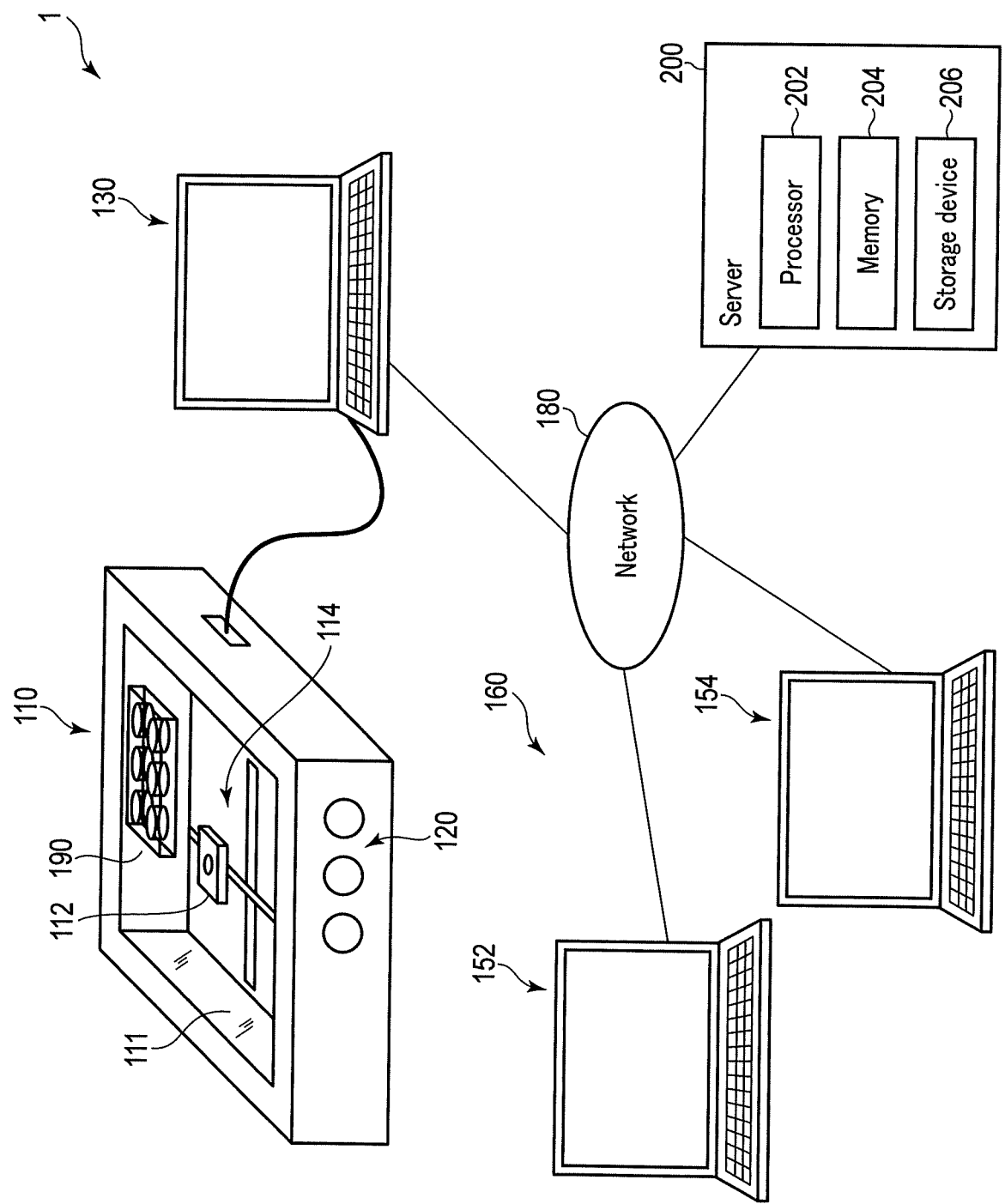
FIG. 1 is a diagram showing an outline of an exemplary configuration of an observation system.
Figure 2:
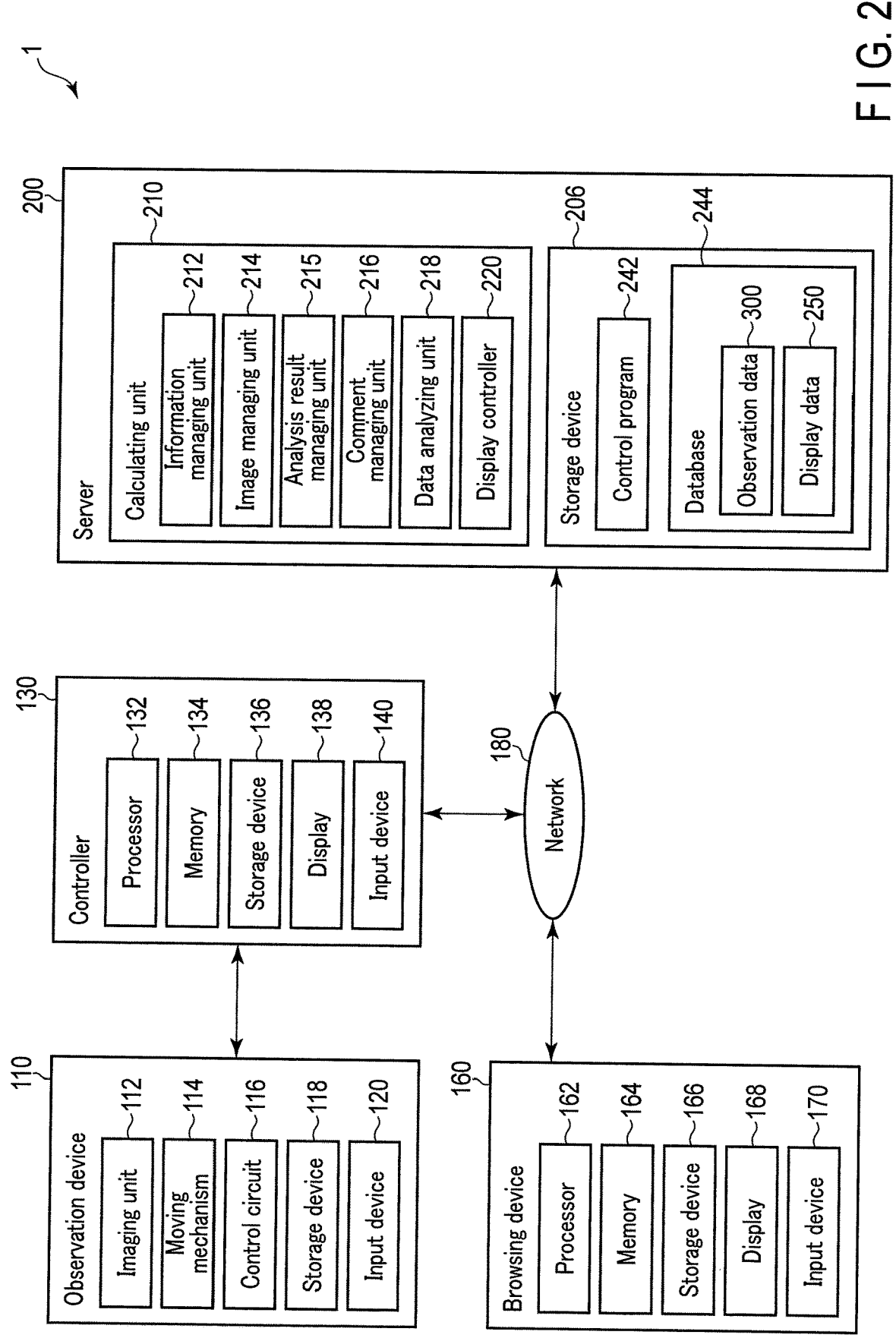
FIG. 2 is a block diagram showing an outline of an exemplary configuration of the observation system.

FIGS. 1 and 2 schematically show an exemplary configuration of an observation system 1 according to the embodiment. The observation system 1 includes an observation device 110. As shown in FIG. 1, the observation device 110 has the shape of an almost rectangular parallelepiped. A transparent plate 111 is provided on the upper surface of the observation device 110, and a biological sample 190 to be observed is placed on the transparent plate 111. Under the transparent plate, an imaging unit 112 with an imaging lens, an imaging element and the like to image an image of an object closer to the transparent plate 111, and a moving mechanism 114 to move the imaging unit 112 in a plane parallel to the transparent plate 111 are arranged. The range in which the imaging unit 112 can acquire an image in one imaging operation is narrow. When the imaging unit 112 takes images repeatedly while being moved by the moving mechanism 114, the observation device 110 can acquire a wide range of images of the biological sample 190.

As shown in FIG. 2, the observation device 110 includes a control circuit 116 to control the operation of each of the components including the imaging unit 112 and the moving mechanism 114. The control circuit 116 includes, for example, one or more central processing units (CPU), application specific integrated circuits (ASIC) and field programmable gate arrays (FPGA). The observation device 110 also includes a storage device 118 in which images and the like acquired by imaging are recorded. Programs, various parameters and the like used in the control circuit 116 are stored in the storage device 118, the storage area of the control circuit 116 or the like. The observation device 110 also includes an input device 120 used by a user to input start or end of observation, and the like.

The observation device 110 is disposed in, for example, an incubator to take images of states of the biological sample 190 being cultured in the incubator, for example, periodically or irregularly under predetermined conditions, etc. The observation system 1 is connected to the observation device 110 includes a controller 130 to control various operations of the observation device 110, manage images acquired by the observation device 110, conduct various analyses based on the acquired images, and the like. The controller 130 is disposed outside the incubator. The observation device 110 and the controller 130 may be connected by wire or wirelessly. For example, a personal computer (PC) may be used for the controller 130.

Since the controller 130 is, for example, a general PC, it includes a processor 132 such as a CPU, a memory 134 such as a DRAM, a storage device 136 such as a hard disk and a flash memory, a display 138 such as a liquid crystal display, an input device 140 such as a keyboard, a mouse and a touch panel, and the like, as shown in FIG. 2.

The controller 130 is connected to a network 180. The observation system 1 further includes a browsing device 160 and a server 200 which are connected to each other via the network 180. As shown in FIG. 1, the server 200 includes a processor 202, a memory 204, a storage device 206 and the like. Images and the like of the biological sample 190 acquired by the observation device 110 are uploaded to the server 200 via the controller 130 and recorded in the storage device 206.

FIG. 1 depicts a first PC 152 and a second PC 154 as an example of the browsing device 160. The terminal serving as the browsing device 160 is not limited to a PC but may be a tablet information terminal or the like. Any number of terminals may be used as the browsing device 160. Since the browsing device 160 is, for example, a PC, it includes a processor 162, a memory 164, a storage device 166, a display 168, an input device 170 and the like, as shown in FIG. 2. The browsing device 160 is used to browse an image and the like of the biological sample 190 recorded in the storage device 206 of the server 200. In addition, the controller 130, the browsing device 160 or the like can gain access to the server 200 to register comments regarding the image and the like recorded in the storage device 206. The comments to be registered may include various forms such as text and graphics.

As shown in FIG. 2, the server 200 includes a calculating unit 210 that is implemented by the processor 202 and the like. The calculating unit 210 includes an information managing unit 212 which integrally manages images of the biological sample 190 acquired by the observation device 110 and information such as comments registered by the controller 130, the browsing device 160 or the like. The calculating unit 210 also includes an image managing unit 214 which manages image information. The calculating unit 210 also includes an analysis result managing unit 215 which manages the results of various analyses conducted, for example, based on images. The calculating unit 210 also includes a comment managing unit 216 which manages information such as comments. The calculating unit 210 also includes a data analyzing unit 218 which conducts various analyses, for example, based on images. In addition, the calculating unit 210 includes a display controller 220 that generates a screen to be displayed on the controller 130, the browsing device 160 or the like, which has gained access to the server 200.

For example, a control program 242 related to various calculations performed by the calculating unit 210 is recorded in the storage device 206 of the server 200. A database 244 is also recorded in the storage device 206 of the server 200. The database 244 includes observation data 300 including images, comments, analysis results, etc. of the biological sample 190. The database 244 also includes display data 250 that is information regarding a screen displayed on the controller 130, the browsing device 160 or the like.

[Configuration of Observation Data]

Figure 3:
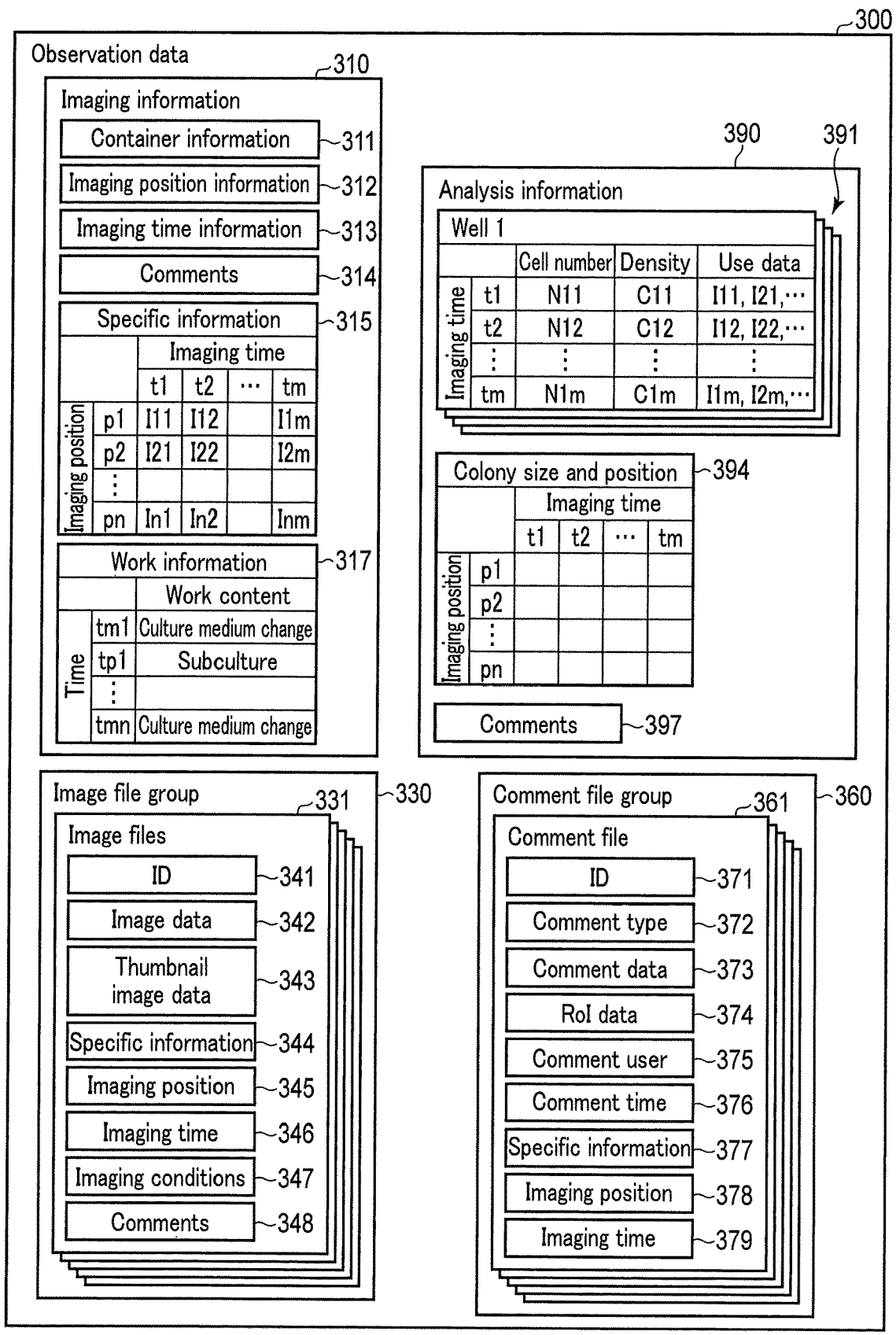
FIG. 3 is a diagram showing an outline of an exemplary configuration of observation data handled in the observation system.

The observation data 300 is generated for each series of observations, for example. The series of observations here includes imaging of the biological sample 190 placed on the transparent plate 111 of the observation device 110, which is performed at a plurality of positions and imaging thereof, which is performed in sequence at a plurality of timings. An example of the configuration of the observation data 300 is shown in FIG. 3. The observation data 300 includes imaging information 310, an image file group 330, a comment file group 360 and analysis information 390.

The imaging information 310 includes information regarding a series of observations including a plurality of imaging operations to be performed using the observation device 110. The imaging information 310 includes container information 311, imaging position information 312, imaging time information 313, comments 314, specific information 315, work information 317, and the like. The container information 311 includes information regarding the container of the biological sample 190 to be observed. The container may be, for example, a Petri dish, culture flasks of different sizes, and multi-well dishes with different well numbers. The imaging position information 312 includes information regarding an imaging position that is a position of the imaging unit 112 moved by the moving mechanism 114 at the time of imaging. In order to acquire a wide range of images of the biological sample 190, imaging is performed at a plurality of imaging positions. The imaging time information 313 includes information regarding imaging time that is start time of imaging by the imaging unit 112, which is repeated at intervals, for example, periodically. The timing of imaging can optionally be set. The comments 314 include information regarding a comment to be registered by, for example, the controller 130, the browsing device 160 or the like. The comments 314 may include, for example, the contents of comments regarding the imaging information 310 among the registered comments, information specifying a comment file regarding the imaging information 310 among the comment files to be described later, and the like. The specific information 315 includes information (e.g., I11, I12, . . . , Inm in FIG. 3) indicating one imaging operation specified by the relationship between the imaging position (e.g., p1, p2, . . . , pn in FIG. 3) and the imaging time (e.g., t1, t2, . . . , to in FIG. 3). The work information 317 includes information about various works such as culture medium change, subculture work, and reagent addition work concerning the biological sample 190, which are performed during a series of observations. In the work information 317, information about each work is associated with time when the work was performed.

The image file group 330 includes a plurality of image files 331 to be created for each image captured by the imaging unit 112. Each of the image files 331 includes ID 341, image data 342, thumbnail image data 343, specific information 344, an imaging position 345, imaging time 346, imaging conditions 347, comments 348, and the like. The ID 341 includes ID information attached to each of the image files 331. The image data 342 includes image data acquired by the imaging unit 112. The thumbnail image data 343 includes data of a thumbnail image created based on the image data 342. The thumbnail image data 343 can be used, for example, to display a list of the captured images included in a display screen displayed by the controller 130, the browsing device 160 or the like. The specific information 344 includes information (Inm, etc.) which indicates imaging when the image data 342 is acquired and which is managed by the specific information 315 included in the imaging information 310. Using this information and the specific information 315 included in the imaging information 310, the imaging position where and the imaging time when the image data 342 is acquired can be specified. The imaging position 345 includes information of an imaging position where the image data 342 is acquired. The imaging time 346 includes information of imaging time when the image data 342 is acquired. Since the specific information 344, and imaging position 345 and imaging time 346 have finally obtained information in common, only one of them may be recorded in the image file 331 or both of them may be recorded. If both are recorded, a more convenient one can be used according to the intended use. The imaging conditions 347 include information of imaging conditions such as a setting of the imaging unit 112 when the image data 342 is acquired. The imaging conditions 347 include, for example, information such as a focal length of the imaging lens, a focus position, an aperture, exposure time, illumination conditions and filter conditions. The comments 348 include information regarding comments to be registered by, for example, the controller 130 or the browsing device 160. The comments 348 may include, for example, comments on the image files 331 among the registered comments and information specifying a comment file related to the image files 331 among the comment files to be described later.

The comment file group 360 includes a plurality of comment files 361 regarding comments registered by the controller 130, the browsing device 160 or the like. Each of the comment files 361 includes ID 371, a comment type 372, comment data 373, RoI data 374, a comment user 375, comment time 376, specific information 377, an imaging position 378, imaging time 379, and the like. The ID 371 includes ID information attached to each of the comment files 361. As will be described later, the comment type 372 includes information indicating whether a comment is registered for an image, whether a comment is registered for a graph showing an analysis result, whether a comment is registered for a time bar, whether a comment is registered as a reply to the comment, and the like. The comment data 373 includes, for example, text information of comments registered by the controller 130, the browsing device 160 or the like. The RoI data 374 includes information regarding figures, characters, their positions and sizes, etc., such as RoI registered by the controller 130, the browsing device 160 or the like. The comment user 375 includes information to identify a user who registered the comments. The user identifying information may be based on, for example, login information to be authenticated at the time of operation of the controller 130, the browsing device 160 to register comments. The comment time 376 includes date and time information and the like in which comments are registered by the controller 130, the browsing device 160 or the like. The specific information 377 may include information (Inm, etc.) indicating imaging when the comment-attached image data 342 is acquired, which is managed by the specific information 315 included in the imaging information 310. Using this information and the specific information 315 included in the imaging information 310, an imaging position where and imaging time when the image data 342 is acquired can be specified. The specific information 377 may also include information indicating imaging time (tm, etc.) to which comments are attached in a graph and a time bar, which is managed by the specific information 315 included in the imaging information 315. The imaging position 378 includes information on the imaging position where the image data 342 with comments is acquired. The imaging time 379 includes information of imaging time with comments.

The analysis information 390 includes information regarding a result of analysis conducted based on the image data 342 and the like. The analysis information 390 includes cell number and density information 391, colony size and position information 394, and comments 397. The cell number and density information 391 includes information on the number of cells and the density thereof obtained based on the image data 342, for example, for each well of the container of the biological sample 190 and for each imaging time. The cell number and density information 391 also includes specific information indicating an image used in determining the cell number and density. The colony size and position information 394 includes information on, e.g., the size and position of a colony contained in the image, which is obtained for each imaging position and for each imaging time, namely, for each image data 342. The comments 397 include information regarding comments registered by the controller 130, the browsing device 160 or the like.

[Operation of Observation Device]

The operation of the observation device 110 will be described. The observation device 110 repeatedly images the biological sample 190 according to a preset schedule by a user using the controller 130, for example. The period for which the imaging is performed repeatedly may be, for example, several days to several weeks or several months. When each imaging is performed, the user presets a position of the biological sample 190 to be imaged, using the controller 130, for example. In addition, when the biological sample 190 is imaged for a long period of time, it is subjected to works such as culture medium change and subculture work. When these works are performed, the user inputs information indicating that a work is to be performed, using the input device 120 of the observation device 110 or the controller 130.

Figure 4:
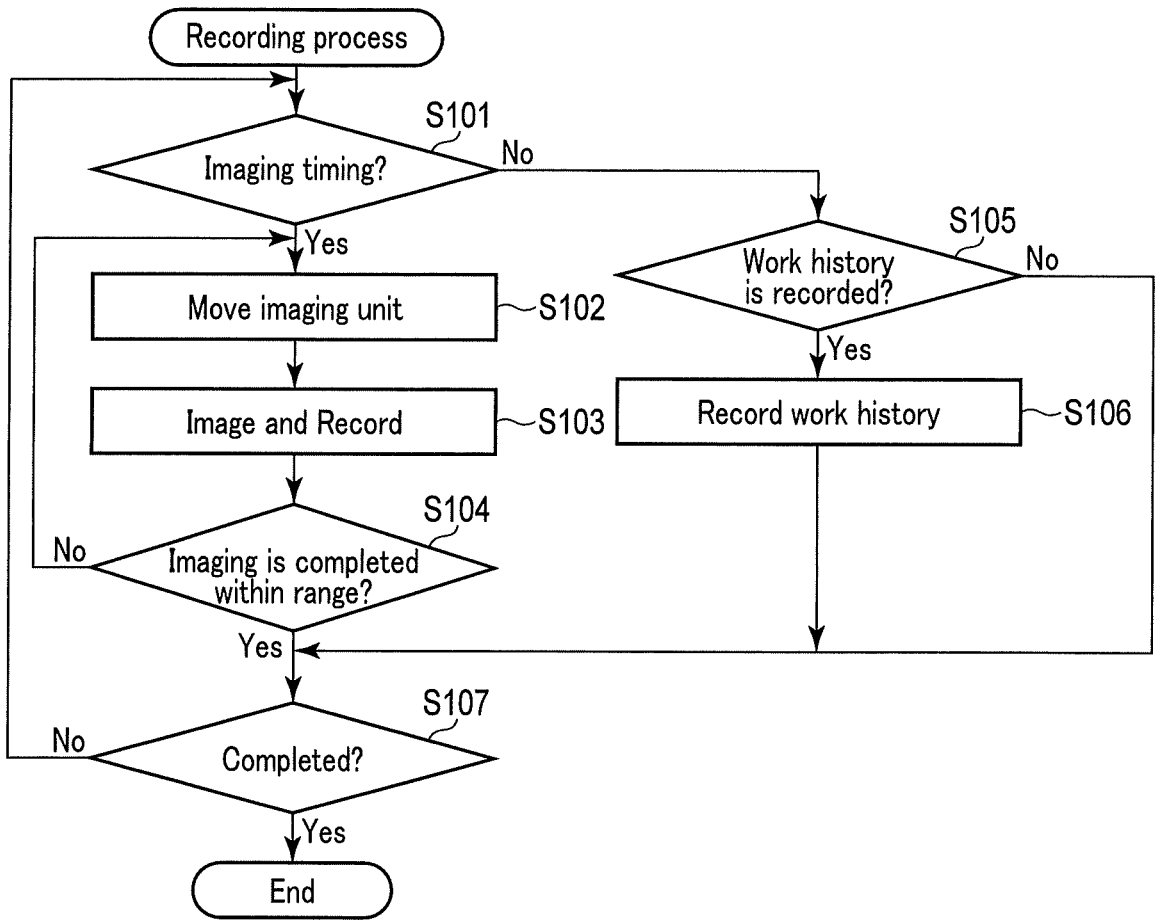
FIG. 4 is a flowchart showing an outline of an example of a recording process to be performed in an observation device.

The operation of a recording process to be performed by the observation device 110 will be described with reference to the flowchart shown in FIG. 4. In step S101, the control circuit 116 of the observation device 110 determines whether timing to perform imaging has come or not. For example, the control circuit 116 determines whether timing to perform imaging has come, based on a preset schedule. The control circuit 116 may also determine that timing to perform imaging has come, in response to a user's imaging instruction that can be input through the input device 120 or the controller 130 of the observation device 110. When timing to perform imaging has come, the process proceeds to step S102. At this time, the biological sample 190 is imaged using the imaging unit 112. That is, in step S102, the control circuit 116 instructs the moving mechanism 114 to move the imaging unit 112 to the imaging position. In step S103, the control circuit 116 instructs the imaging unit 112 that has moved to the imaging position to perform an imaging operation. The control circuit 116 performs various processes on the image acquired by imaging and causes the storage device 118 of the observation device 110 to store the image. In step S104, the control circuit 116 determines whether the imaging has been completed within the preset imaging range. When the imaging is not completed, the process returns to step S102. That is, the movement, imaging operation and recording of imaging results of the imaging unit 112 are repeated until they are completed at all of the set imaging positions. When the control circuit 116 determines in step S104 that the imaging is completed, the process proceeds to step S107.

If the control circuit 116 determines in step S101 that timing to perform imaging has not come, the process proceeds to step S105. In step S105, the control circuit 116 determines whether to record a work history. For example, the control circuit 116 determines that the work history is to be recorded when the culture medium change, subculture work and the like of the biological sample 190 are performed, and the input device 120 or the like of the observation device 110 is operated. When the work history is recorded, the process proceeds to step S106. In step S106, the control circuit 116 causes the storage device 118 to record the work history. This work history becomes the original data of the work information 317 including the work time and the work content of the observation data 300 recorded in the server 200. After that, the process proceeds to step S107. If the control circuit 116 determines in step S105 that the work history is not recorded, the process proceeds to step S107.

In step S107, the control circuit 116 determines whether the scheduled series of imaging operations has been completed. If it determines that the series of imaging operation has not been completed, the process returns to step S101. That is, before the scheduled imaging is completed, the imaging is performed and its result is recorded at imaging timing, and the work history is recorded in the storage device 118 when an instruction to record the work history is input. The foregoing process is repeated when the imaging timing is not timing when the work history is recorded.

When the control circuit 116 determines in step S107 that the scheduled series of imaging operations has been completed, the process is terminated.

The data regarding the captured image, the work history and the like recorded in the storage device 118 of the observation device 110 is read by the controller 130 and subjected to necessary processing, and then recorded as the observation data 300 in the storage device 206 of the server 200 via the network 180. That is, an image file 331 which includes image data 342 and to which necessary information is added, is generated. Such image files are collected to generate an image file group 330. In addition, imaging information 310 is generated based on information of an imaging schedule, a work history and the like. The imaging information 310, the image file group 330 and the like may be generated by the controller 130 or the calculating unit 210 of the server 200.

Furthermore, various analyses are conducted based on the image data 342 included in the image file group 330. As a result, analysis information 390 including cell number and density information 391 and colony size and position information 394 is generated. These analyses may be done by the controller 130 or the calculating unit 210 of the server 200. The generated analysis information 390 is also recorded as part of the observation data 300.

[Management of Observational Data]

Figure 5:
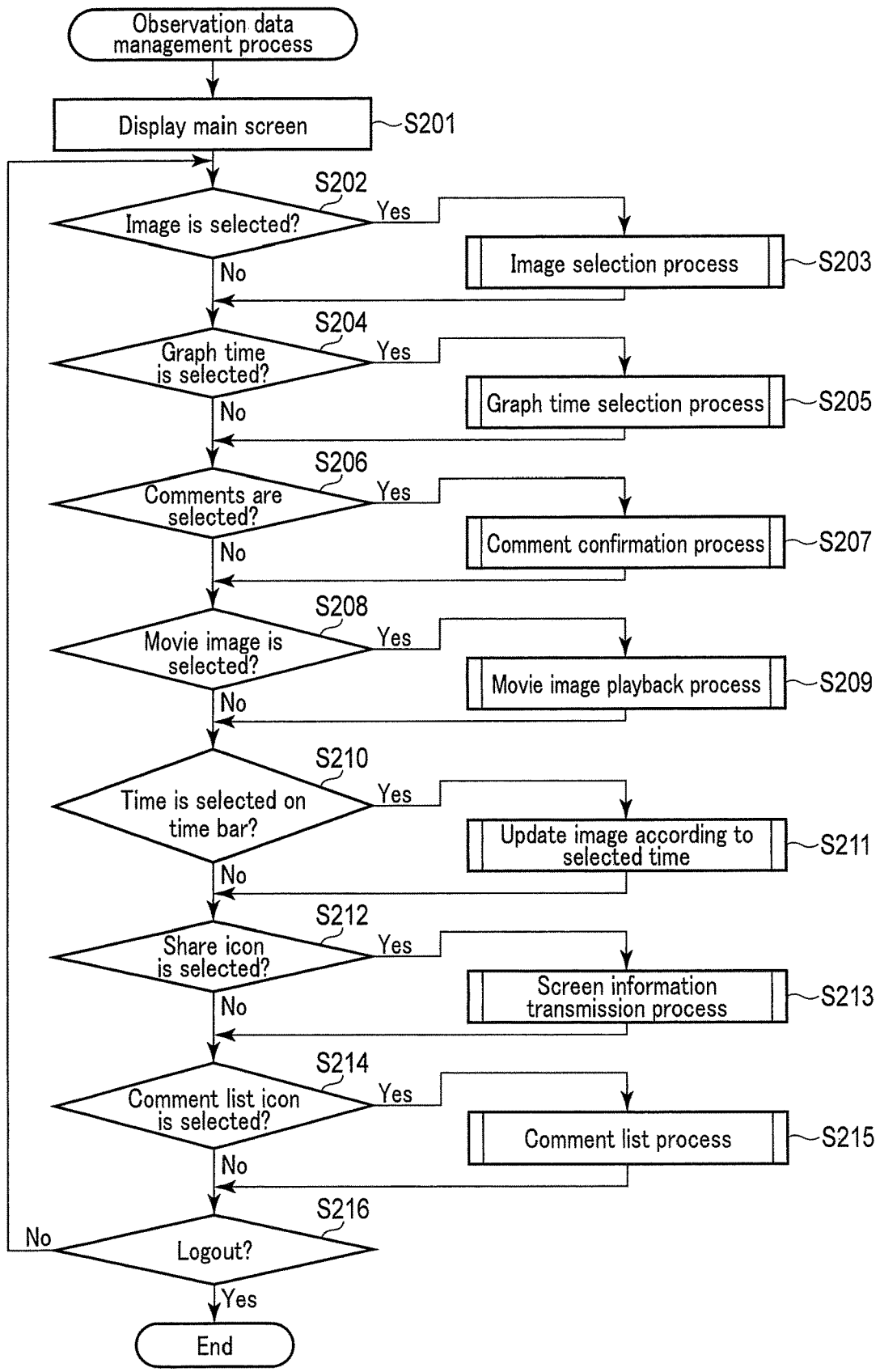
FIG. 5 is a flowchart showing an outline of an example of an observation data management process to be performed in the observation system.

The management of the observation data 300, such as browsing of the observation data 300 recorded as the database 244 in the storage device 206 of the server 200 and registration of comments thereon, will be described. FIG. 5 is a flowchart schematically showing an observation data management process performed by the calculating unit 210 of the server 200. The process is performed when a user gains access to the server 200 using a terminal such as the controller 130 and the browsing device 160, and the server 200 responds to an instruction from the terminal to the server 200.

In step S201, the calculating unit 210 transmits information of the main screen to a terminal such as the controller 130 and the browsing device 160, which is gaining access to the server 200, and causes the display of the terminal to display the main screen. The terminal such as the controller 130 and the browsing device 160, which has received the information of the main screen, displays the main screen on the display. The terminal also receives a point selected by the user on the main screen through an input device such as a mouse. The terminal transmits information regarding the point on the main screen selected by the user to the server 200. The calculating unit 210 of the server 200 performs various processes based on the point selected by the user and acquired from the terminal.

Figure 6:
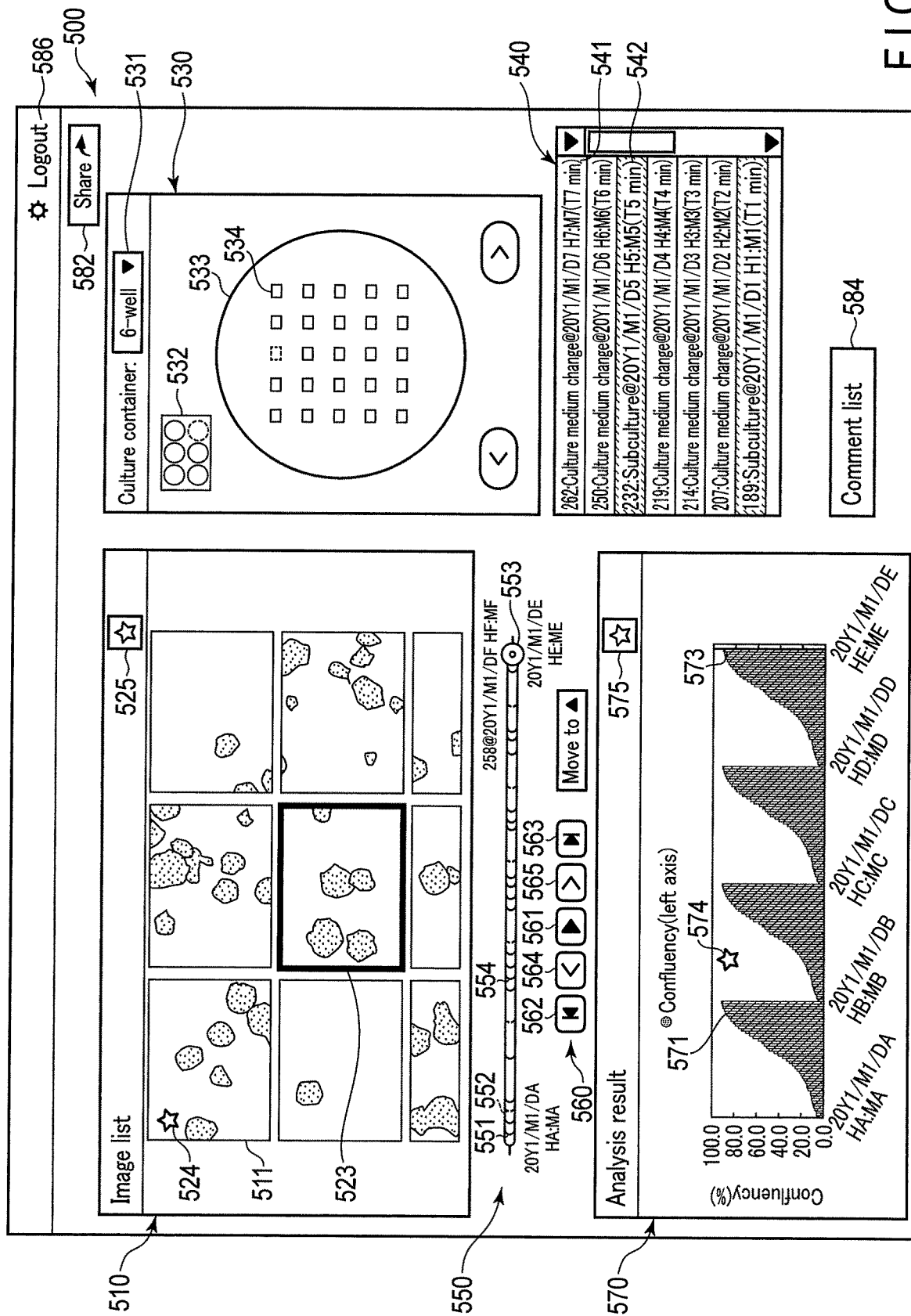
FIG. 6 is a diagram showing an outline of an example of a main screen to be displayed on a display.

An example of a main screen 500 is shown in FIG. 6. The main screen 500 includes an image display area 510, a sample information display area 530, a work information display area 540, a time bar 550, a movie image operation icon 560 and an analysis result display area 570.

In the image display area 510, for example, thumbnail images 511 of images acquired by the observation device 110 are displayed as a list. For example, the thumbnail images displayed in the list may be obtained at different imaging positions and may be obtained at imaging time that is considered to be the same. When the designated imaging time is changed, for example, by operating the time bar 550 to be described later, an image to be displayed in the image display area 510 can also be changed. When a specific image is selected, the selected image is largely displayed in the image display area 510.

When any one of the thumbnail images is selected by the user, a highlight display 523 is applied to the selected image. The highlight display 523 can be applied to a thumbnail image corresponding to the imaging position, for example, even by selecting an imaging position 534 displayed in the sample information display area 530 to be described later.

When there is an image to which comments are added among images indicated by the thumbnail images displayed in the image display area 510, an icon 524 with comments is superimposed on a corresponding thumbnail image 511. In addition, an icon 525 to add comments, selected by the user when new comments are added, is placed in the image display area 510.

The sample information display area 530 includes a container display 531 indicating a type of the container of the biological sample 190. The example of FIG. 6 is a case where observation is performed in a 6-well dish. The container display 531 is based on the container information 311 included in the imaging information 310 of the observation data 300. When the container is, for example, a multi-well dish, the sample information display area 530 may include a well display 532. In the example shown in FIG. 6, it is shown that a 6-well dish is used because a schematic view of the 6-well dish is displayed as the well display 532. Furthermore, the well display 532 indicates the currently selected well by differentiating the display of the currently selected well from that of the other wells. In the example shown in FIG. 6, the well display 532 indicates that the lower-right well is selected by broken lines.

The sample information display area 530 includes a container map 533. The container map 533 indicates the imaging position 534 in the currently selected well or the like. In the example shown in FIG. 6, it indicates a plurality of imaging positions 534 set in the lower right well of the 6-well dish. The imaging positions 534 are displayed based on the imaging position information 312 included in the imaging information 310. When any of the imaging positions 534 is selected, a thumbnail image in the image display area 510 corresponding to the selected imaging position is highlighted as the highlight display 523 of the selected image.

In the container map 533, the positions and sizes of colonies obtained as analysis results based on the images are shown as schematic diagrams. The display of the positions and sizes of the colonies is based on the colony size/position information 394 included in the analysis information 390.

The work information display area 540 displays a list of work information. This list is displayed based on the work information 317 included in the imaging information 310. The work information to be displayed includes culture medium change information 541, subculture work information 542, and the like. Regarding each item of the information, for example, information on date and time when work was performed, time required for the work, and the like are displayed.

The time bar 550 displays a series of observation schedules in a bar format. The time bar 550 indicates a time series from the left to the right. The time bar 550 includes a selected time display 553 indicating the currently selected time. The currently selected time corresponds to the imaging time when an image corresponding to the thumbnail image 511 displayed in the image display area 510 was imaged. For example, the user can select a point on the time bar 550 and then select time. When time is selected by the user, the selected time is indicated by the selected time display 553. In addition, a thumbnail image relating to the image acquired at imaging time corresponding to the selected time is displayed in the image display area 510.

The time bar 550 displays work information. For example, the time bar 550 is provided with a culture medium change display 551 indicating timing of culture medium change and a subculture work display 552 indicating timing of subculture work. It may also be provided with, for example, a reagent addition display indicating timing of reagent addition or the like. The culture medium change display 551, the subculture work display 552, the reagent addition display and the like are displayed based on the work information 317 of the imaging information 310. The time bar 550 is also provided with a comment indicator 554 indicating a point of time at which comments are attached. The comment indicator 554 is displayed based on the comments 314 of the imaging information 310.

The movie image operation icon 560 includes an icon used when the user changes the image displayed in the image display area 510. The movie image operation icon 560 includes a playback icon 561, an oldest image selection icon 562, a latest image selection icon 563, a past selection icon 564, a future selection icon 565, and the like. When the playback icon 561 is selected, a time-lapse movie image is played back in which images are displayed in the image display area 510 in time series from the currently selected point of time. When the oldest image selection icon 562 is selected, the oldest-acquired image is selected from among a series of images and displayed in the image display area 510. When the latest image selection icon 563 is selected, the latest-acquired image is selected from among the series of images and displayed in the image display area 510. When the past selection icon 564 is selected, images older than the currently selected image are selected in sequence and displayed in sequence in the image display area 510. When the future selection icon 565 is selected, images newer than the currently selected image are selected in sequence and displayed in sequence in the image display area 510. The selected time indicator 553 of the time bar 550 moves according to the time selected on a moment-to-moment basis.

The analysis result display area 570 displays information included in the cell number and density information 391 of the analysis information 390 in a graph format. The graph shows cell density 571. The graph also includes a selected time indicator 573 indicating the currently selected time. The time indicated by the selected time indicator 573 corresponds to the selected time indicator 553 of the time bar 550. In the analysis result display area 570, when comments are added to the graph, an icon 574 with comments is displayed at a position indicating time when the comments are added. In addition, an icon 575 to add comments, which is selected by the user when new comments are added, is placed in the analysis result display area 570. Note that the graph may indicate the number of cells instead of or together with the cell density.

The main screen 500 includes a share icon 582, a comment list icon 584 and a logout icon 586, which will be described later.

Referring back to FIG. 5, the observation data management process will be described again. In step S202, the calculating unit 210 determines whether an image is selected by the user. For example, when any of the thumbnail images in the image display area 510 is selected by the user, the calculating unit 210 determines that an image is selected. If no image is selected, the process proceeds to step S204. On the other hand, when an image is selected, the process proceeds to step S203. In step S203, the calculating unit 210 performs an image selection process.

Figure 7:
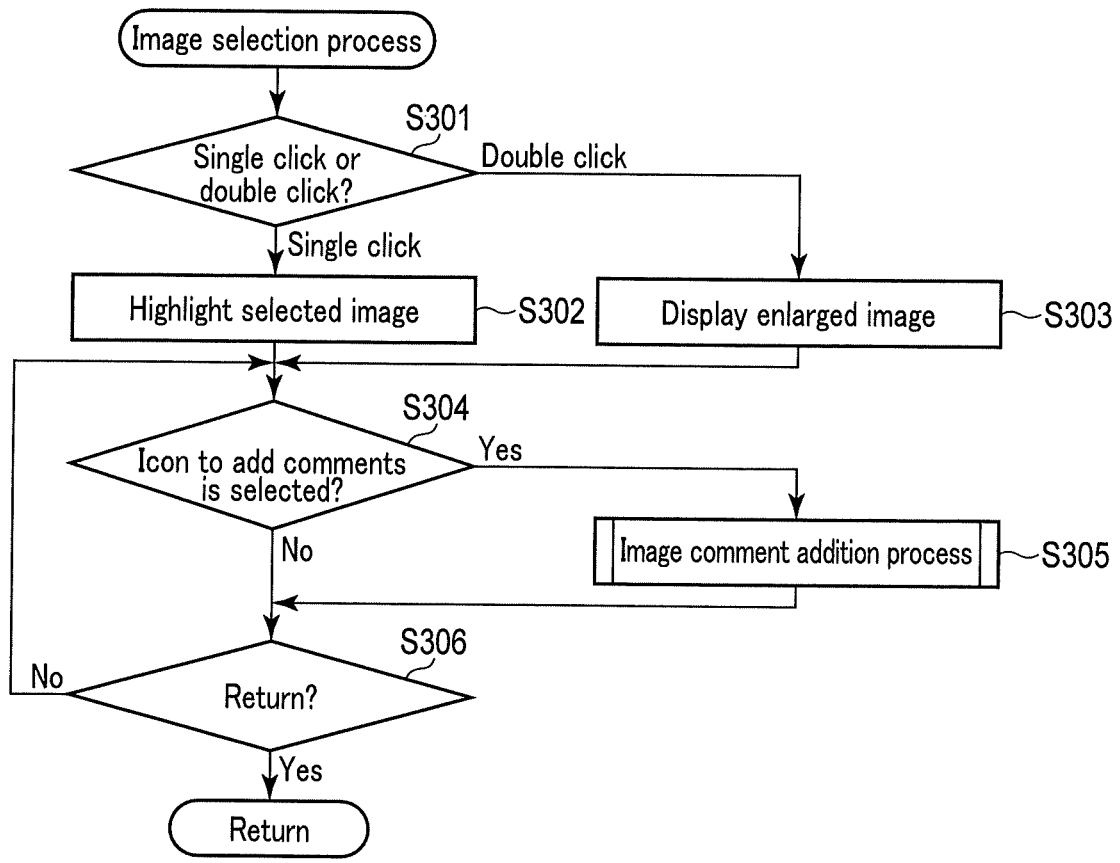
FIG. 7 is a flowchart showing an outline of an example of an image selection process to be performed in the observation system.

The image selection process will be described with reference to the flowchart shown in FIG. 7.

In step S301, the calculating unit 210 determines whether the type of a click when an image is selected is a single click or a double click. If it is a single click, the process proceeds to step S302. In step S302, the calculating unit 210 causes the display device to display a screen on which the highlight display 523 is applied to the selected image, as shown in FIG. 6, for example. After that, the process proceeds to step S304.

If the calculating unit 210 determines in step S301 that a double click has been made, the process proceeds to step S303. In step S303, the calculating unit 210 displays an enlarged image of the selected image to fill the image display area 510, for example. After that, the process proceeds to step S304.

When the process of step S304 is performed, any image is selected, and the highlight display 523 is applied to the selected image or the selected image is displayed largely. In step 304, the calculating unit 210 determines whether the icon 525 to add comments is selected from the image display area 510. When the icon 525 is not selected, the process proceeds to step S306. When the icon 525 is selected, the process proceeds to step S305. In step S305, the calculating unit 210 performs an image comment addition process to add comments to an image. After that, the process proceeds to step S306.

In step S306, the calculating unit 210 determines whether the process should return to the observation data management process by terminating the image selection process, for example, when a position other than the icon 525 to add comments is clicked. When the process does not return to the observation data management process, the process returns to step S304 and waits to select the icon 525 to add comments.

On the other hand, when the process returns to the observation data management process, the image selection process is terminated and the process returns to the observation data management process.

Figure 8:
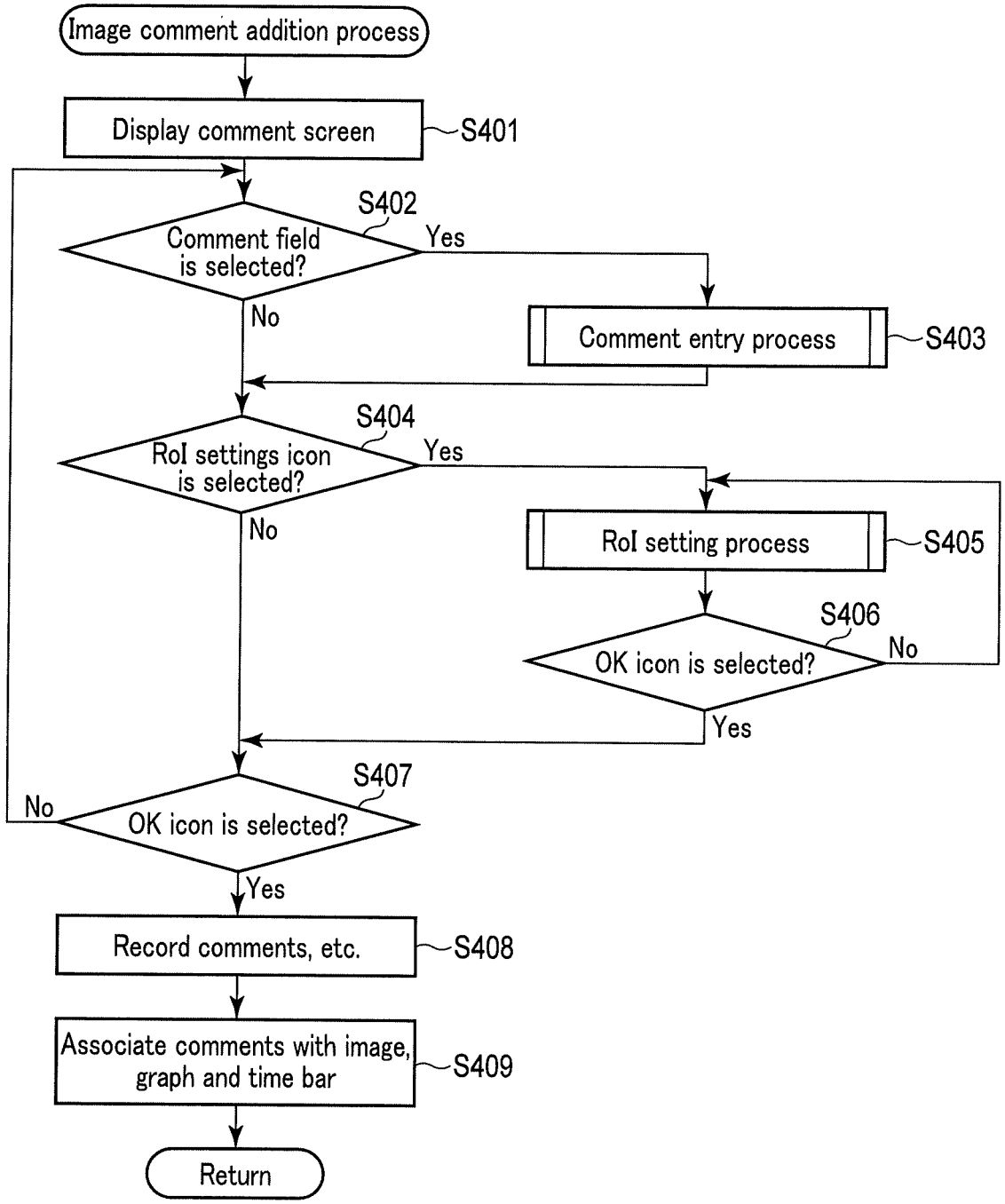
FIG. 8 is a flowchart showing an outline of an example of an image comment addition process to be performed in the observation system.

The image comment addition process to be performed in step S305 when the icon 525 to add comments is selected, will be described with reference to the flowchart shown in FIG. 8.

Figure 9:
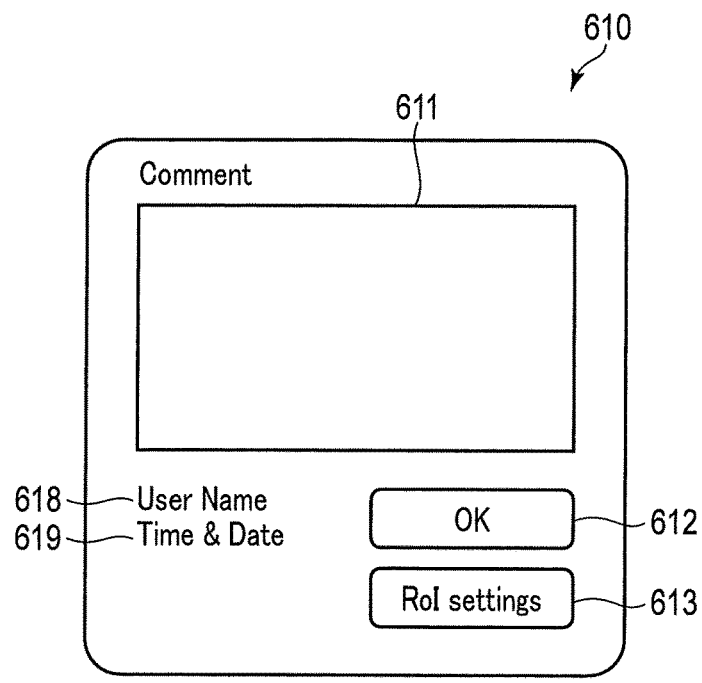
FIG. 9 is a diagram showing an outline of an example of a comment screen to be displayed on the display.

In step S401, the calculating unit 210 causes the display to display a comment screen to add comments to an image. An example of the comment screen is shown in FIG. 9. As shown in FIG. 9, a comment screen 610 includes a comment field 611, an OK icon 612 and a RoI setting icon 613. On the comment screen 610, information to identify a user, such as the name and ID of a user who is currently performing an operation, that is, a user who is going to register the image comment, is displayed in a user name display field 618. Information such as user name and ID is acquired from the server 200 through user authentication to be performed when the user gains access to the server 200. In addition, on the comment screen 610, the date and time when the user is going to add comments, that is, the current date and time, are displayed in a date and time display field 619.

In step S402, the calculating unit 210 determines whether the comment field 611 is selected. When the comment field 611 is not selected, the process proceeds to step S404. On the other hand, when the comment field 611 is selected, the process proceeds to step S403. In step S403, the calculating unit 210 performs a comment entry process in which the user enters comments on, for example, text information in the comment field 611. After that, the process proceeds to step S404. The comments may freely be entered by the user, one of fixed phrases may be selected, or one of preset symbols, signs or the like may be selected.

In step S404, the calculating unit 210 determines whether the RoI setting icon 613 is selected. When the RoI setting icon 613 is not selected, the process proceeds to step S407. On the other hand, when the RoI setting icon 613 is selected, the process proceeds to step S405. In step S405, the calculating unit 210 performs n RoI setting process.

Figure 10:
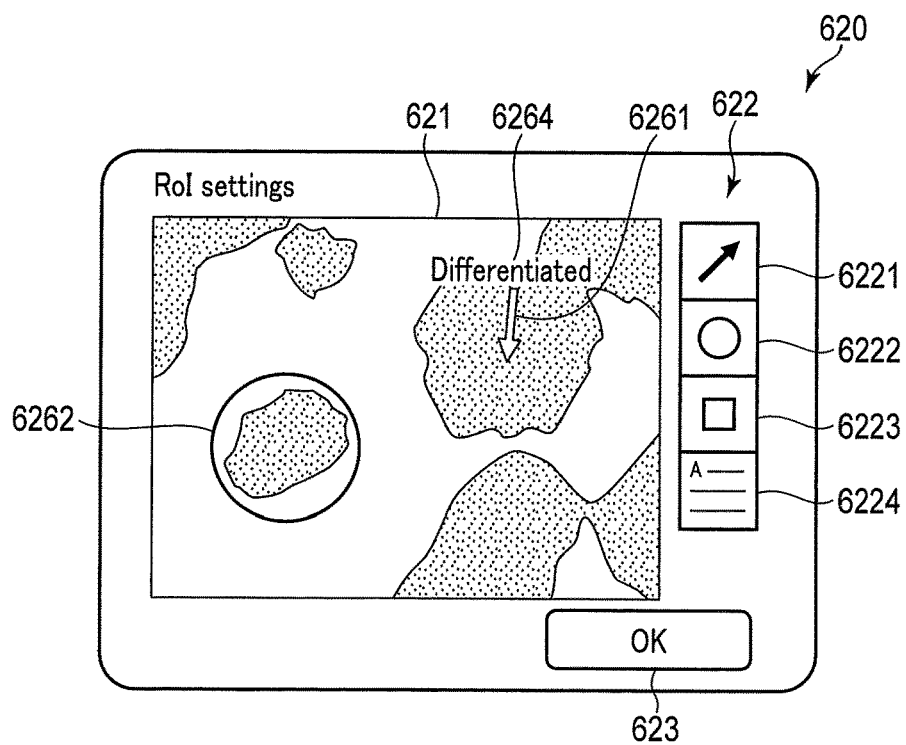
FIG. 10 is a diagram showing an outline of an example of a RoI setting screen to be displayed on the display.

In the RoI setting process, n RoI setting screen 620 as shown in FIG. 10 is displayed on the display. The RoI setting screen 620 includes an image display area 621, a RoI tool 622 and an OK icon 623. The currently selected image is displayed in the image display area 621. As the RoI tool 622, an arrow tool 6221, a circle tool 6222, a square tool 6223 and a text tool 6224 are prepared, as shown in FIG. 10, for example. When a point in the image display area 621 is selected while the arrow tool 6221 of the RoI tool 622 is selected, an arrow is displayed in the image display area 621 as indicated by the arrow 6261 in FIG. 10. The user can change the position, direction and the like of an arrow 6261 by dragging or the like. Also, when a point in the image display area 621 is selected while the text tool 6224 of the RoI tool 622 is selected, the user can enter any text in the image display area 621 as in the text field 6264 of FIG. 10. When a point in the image display area 621 is selected while the circle tool 6222 of the RoI tools 622 is selected, a circle representing RoI is displayed in the image display area 621 as in a circle 6262 in FIG. 10. The user can change the position, size and the like of the circle 6262 by dragging or the like. Similarly, when a point in the image display area 621 is selected while a square tool 6223 of the RoI tool 622 is selected, a square representing RoI is displayed in the image display area 621. The user can set a RoI or the like for the image while selecting the RoI tool 622.

In step S406, the calculating unit 210 determines whether the OK icon 623 of the RoI setting screen 620 is selected. If the OK icon 623 is not selected, the process returns to step S405 to continue the RoI setting process. When the OK icon 623 is selected, the RoI setting screen 620 is closed, and the process proceeds to step S407.

In step S407, the comment screen 610 is displayed on the display. In step S407, the calculating unit 210 determines whether the OK icon 612 of the comment screen 610 is selected. When the OK icon 612 is not selected, the process returns to step S402 and waits to enter comments or set RoI. On the other hand, when the OK icon 612 is selected, the process proceeds to step S408.

In step S408, the calculating unit 210 generates comment files 361 based on, for example, comments including text, figures and the like to which comments are added and RoI is set, as described above, and records them in the observation data 300. In step S409, the calculating unit 210 also records necessary information regarding the comments in the comments 348 of the image file 331 regarding the corresponding image. Similarly, the calculating unit 210 records necessary information regarding the comments in the comments 397 of the analysis information 390 that is the original data of a graph displayed in the analysis result display area 570. The calculating unit 210 also records necessary information regarding the comments in the comments 314 of the imaging information 310 that is the origin of the comment indicator 554 of the time bar 550. The necessary information regarding the comments recorded here may be all of the contents of the comments or information for specifying the comment file 361. Thus, the image comment addition process is terminated, and the process returns to the image selection process described with reference to FIG. 7. When the image comment addition process is terminated, the icon 524 with comments is displayed on the selected image, as shown in FIG. 6.

According to the image comment addition process, the image acquired by the user using the observation device 110 can be recorded with a mark put on the part that attracts the user, and a user's opinion on the part can be recorded as comments.

The observation data management process shown in FIG. 5 will be described again. After the image selection process in step S203, the process proceeds to step S204. In step S204 of the observation data management process, the calculating unit 210 determines whether any point of time in the graph of the analysis result display area 570 is selected by the user. When no point of time in the graph is selected, the process proceeds to step S206. On the other hand, when a point of time in the graph is selected, the process proceeds to step S205. In step S205, the calculating unit 210 performs a graph time selection process.

Figure 11:
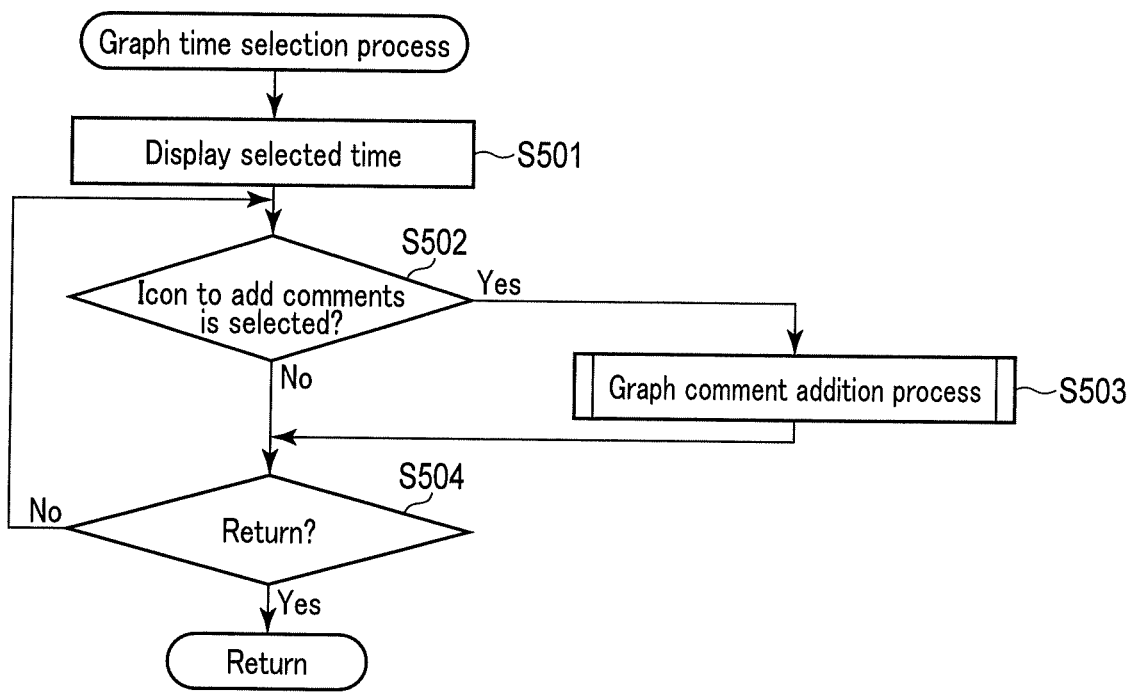
FIG. 11 is a flowchart showing an outline of an example of a graph time selection process to be performed in the observation system.

The graph time selection process will be described with reference to the flowchart shown in FIG. 11. In step S501, the calculating unit 210 displays the selected time display 573 in the graph of the analysis result display area 570 of the main screen 500.

In step S502, the calculating unit 210 determines whether the icon 575 to add comments in the analysis result display area 570 is selected. When the icon 575 is not selected, the process proceeds to step S504. On the other hand, when the icon 575 is selected, the process proceeds to step S503. In step S503, the calculating unit 210 performs a graph comment addition process to add comments to the graph. After that, the process proceeds to step S504.

In step S504, the calculating unit 210 terminates the graph time selection process by, for example, clicking a position other than the icon 575 to add comments, and determines whether the process should return to the observation data management process. When the process does not return to the observation data management process, the process returns to step S502 and waits to select the icon 575. On the other hand, when the process returns to the observation data management process, the graph time selection process is terminated and the process returns to the observation data management process.

Figure 12:
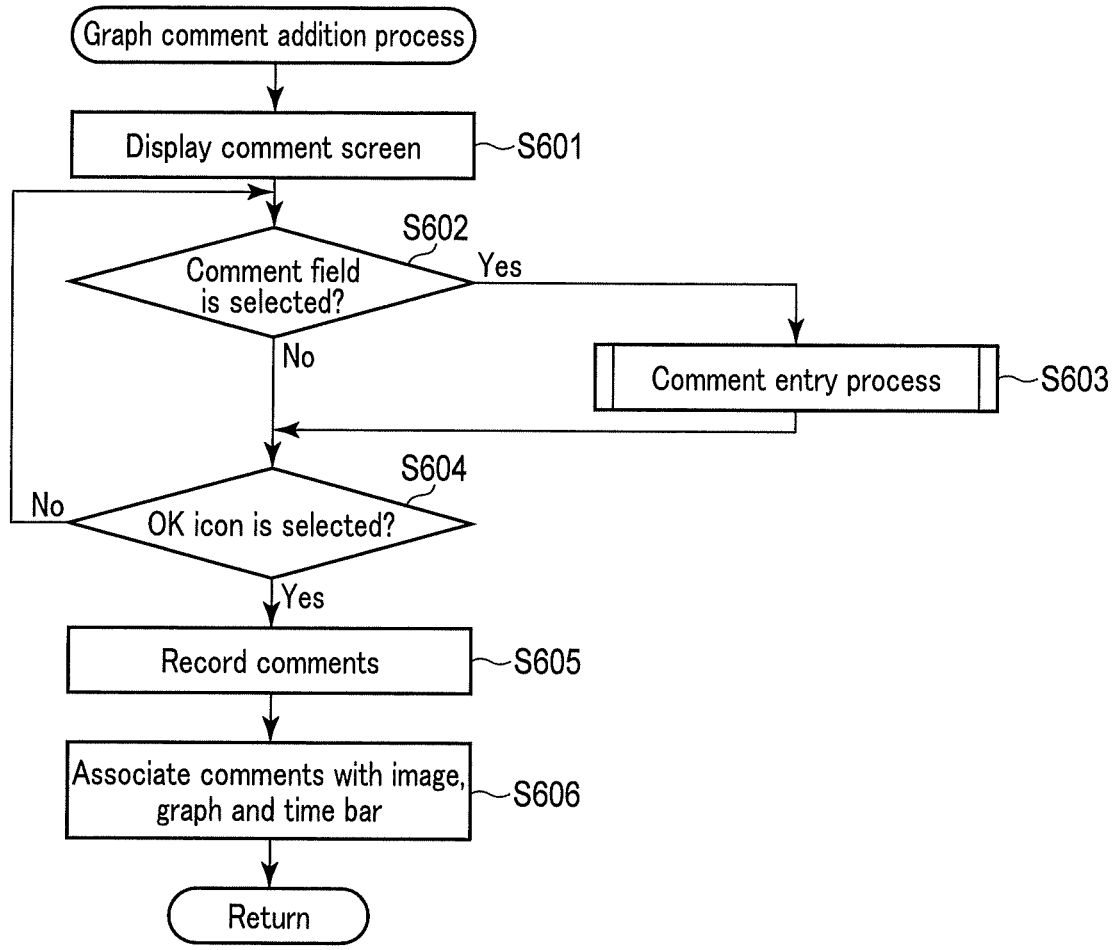
FIG. 12 is a flowchart showing an outline of an example of a graph comment addition process to be performed in the observation system.

The graph comment addition process to be performed in step S503 when the icon 575 to add comments is selected, will be described with reference to the flowchart shown in FIG. 12.

Figure 13:
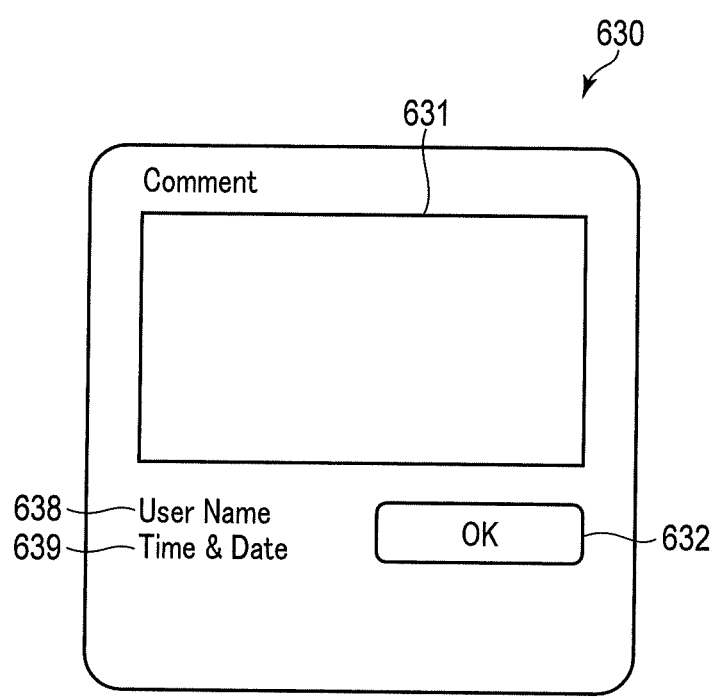
FIG. 13 is a diagram showing an outline of an example of a comment screen to be displayed on the display.

In step S601, the calculating unit 210 causes the display to display a comment screen to add comments to the graph. An example of the comment screen is shown in FIG. 13. As shown in FIG. 13, the comment screen 630 includes a comment field 631 and an OK icon 632. On the comment screen 630, information to identify a user, such as the name and ID of a user who is currently performing an operation, that is, a user who is going to register the graph comments, is displayed in a user name display field 638. In addition, on the comment screen 630, the current date and time when the user is going to add comments is displayed in a date and time display field 639.

In step S602, the calculating unit 210 determines whether the comment field 631 is selected. When the comment field 631 is not selected, the process proceeds to step S604. On the other hand, when the comment field 631 is selected, the process proceeds to step S603. In step S603, the calculating unit 210 performs a comment entry process in which the user enters comments that are, for example, text information in the comment field 631. After that, the process proceeds to step S604.

In step S604, the calculating unit 210 determines whether the OK icon 632 of the comment screen 630 is selected. When the OK icon 632 is not selected, the process returns to step S602 to wait to enter comments. On the other hand, when the OK icon 632 is selected, the process proceeds to step S605.

In step S605, the calculating unit 210 generates comment files 361 based on, for example, comments to which comments are added and RoI is set, as described above, and records them in the observation data 300. In step S606, the calculating unit 210 also records necessary information regarding the comments in the comments 348 of the image file 331 regarding the corresponding image, the comments 397 of the analysis information 390 and the comments 314 of the imaging information 310. The necessary information regarding the comments to be recorded here may be all of the contents of the comments, information for specifying the comment file 361 and the like. Thus, the graph comment addition process is terminated, and the process returns to the graph time selection process described with reference to FIG. 11.

According to the graph comment addition process, an analysis result based on the image acquired by the user using the observation device 110 can be recorded with a mark put on the point of time that attracts the user, and a user's opinion on the point of time can be recorded as comments.

In the example described above, comments are added to a point of time selected in the graph, but comments may be added to a time period having a width specified by the user. The time period may be a time period associated with work, such as a time period between works of culture medium changes, works of subcultures, or the like, based on the work information 317, for example.

The observation data management process shown in FIG. 5 will be described again. After the graph time selection process in step S205, the process proceeds to step S206. In step S206 of the observation data management process, the calculating unit 210 determines whether icon 524 with comments in the image display area 510, the comment indicator 554 in the time bar 550, or the icon 574 with comments in the analysis result display area is selected by the user. If no comments are selected, the process proceeds to step S208. On the other hand, when comments are selected, the process proceeds to step S207. In step S207, the calculating unit 210 performs a comment confirmation process.

Figure 14:
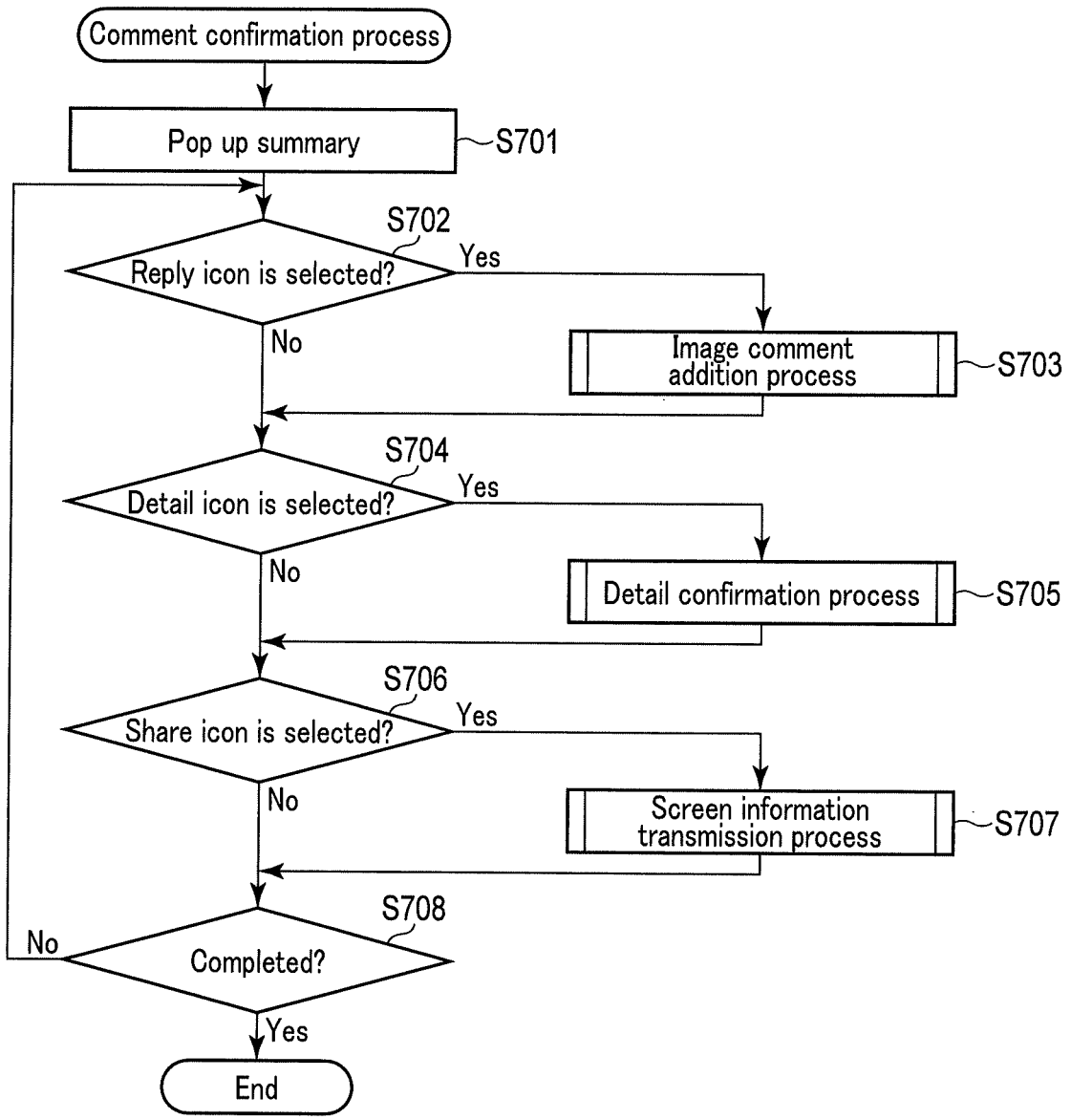
FIG. 14 is a flowchart showing an outline of an example of a comment confirmation process to be performed in the observation system.

The comment confirmation process will be described with reference to the flowchart shown in FIG. 14.

Figure 15:
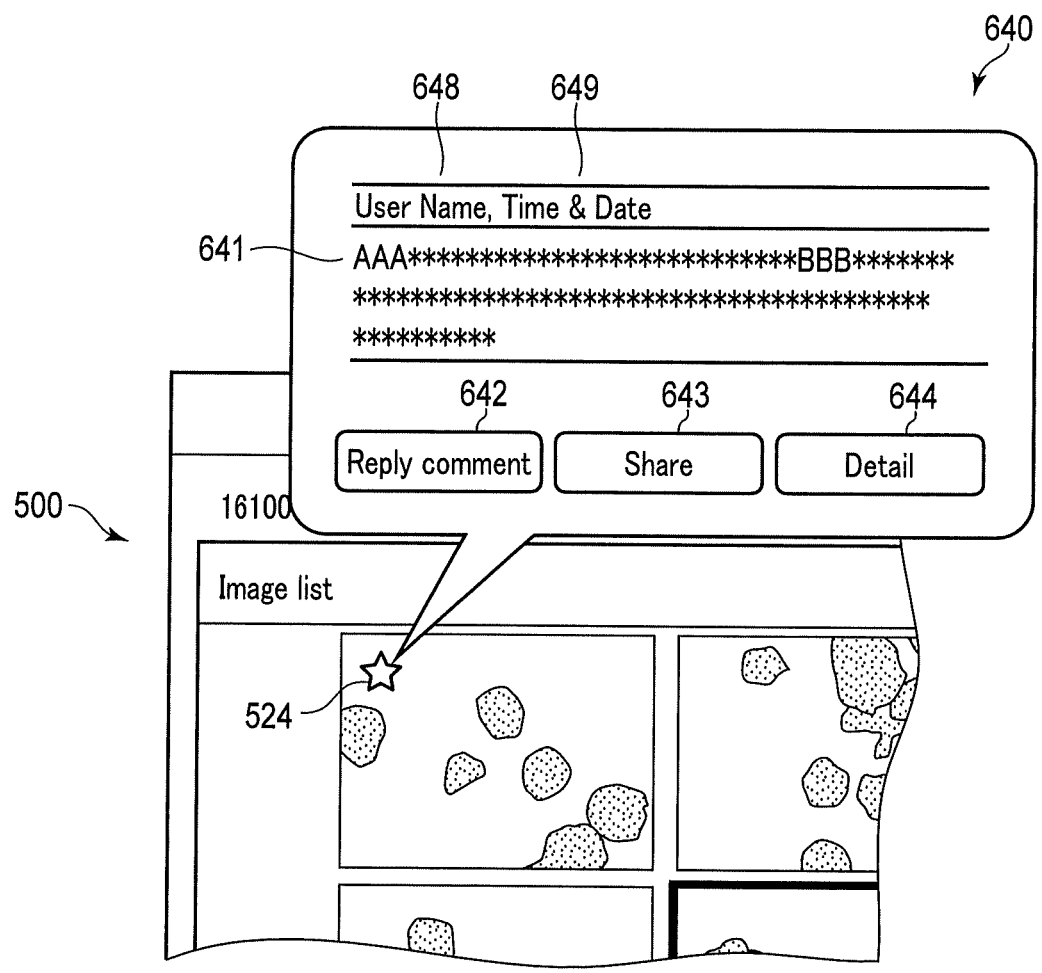
FIG. 15 is a diagram showing an outline of an example of a comment summary display screen to be displayed on the display.

In step S701, the calculating unit 210 causes the display to pop up a summary of the comments. An example of this display is shown in FIG. 15. FIG. 15 shows an example in which the icon 524 with comments is selected from the image display area 510. The same display is applied to the case where the comment indicator 554 in the time bar 550 or the icon 574 with comments in the analysis result display area 570 is selected, though the display positions are different. Hereinafter, an example in which the icon 524 with comments is selected from the image display area will be described. As shown in FIG. 15, a comment summary display screen 640 includes a comment field 641, a user name display field 648, a date and time display field 649, a reply icon 642, a share icon 643 and a detail icon 644. Information of a user who registered the selected comments is displayed in the user name display field 648, and time when the comments was registered is displayed in the date and time display field 649. Text information of the comments is displayed in the comment field 641. These contents are displayed based on the contents of the comment file 361 and the like. The color of characters and the like on the comment summary display screen 640 may vary depending on users who registered their comments and make it easy to recognize who made the comments. The users may be distinguished by fonts or the like as well as colors.

In step S702, the calculating unit 210 determines whether the reply icon 642 is selected. When the reply icon 642 is not selected, the process proceeds to step S704. On the other hand, when the reply icon 642 is selected, the process proceeds to step S703. In step S703, the calculating unit 210 performs the image comment addition process described with reference to FIG. 8. That is, in association with certain comments, a user who has registered the comments or a different user can register additional comments. Additional comments, RoI and the like may be displayed in colors that vary from registration to registration or from registered user to registered user. After the image comment addition process, the process proceeds to step S704.

In step S704, the calculating unit 210 determines whether the detail icon 644 is selected. When the detail icon 644 is not selected, the process proceeds to step S706. On the other hand, when the detail icon 644 is selected, the process proceeds to step S705.

Figure 16:
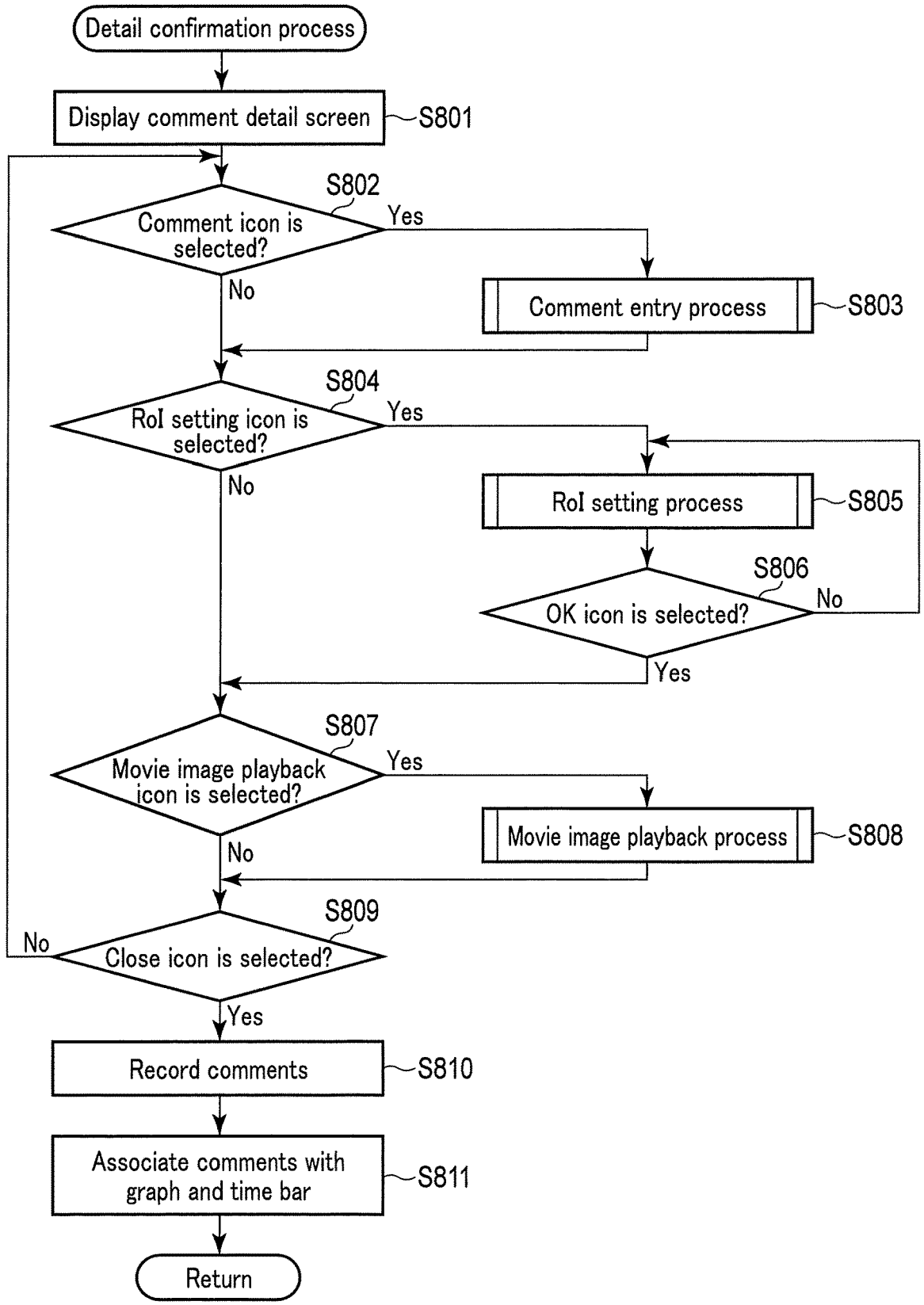
FIG. 16 is a flowchart showing an outline of an example of a detail confirmation process to be performed in the observation system.

In step S705, the calculating unit 210 performs a detail confirmation process. The detail confirmation process will be described with reference to the flowchart shown in FIG. 16.

Figure 17:
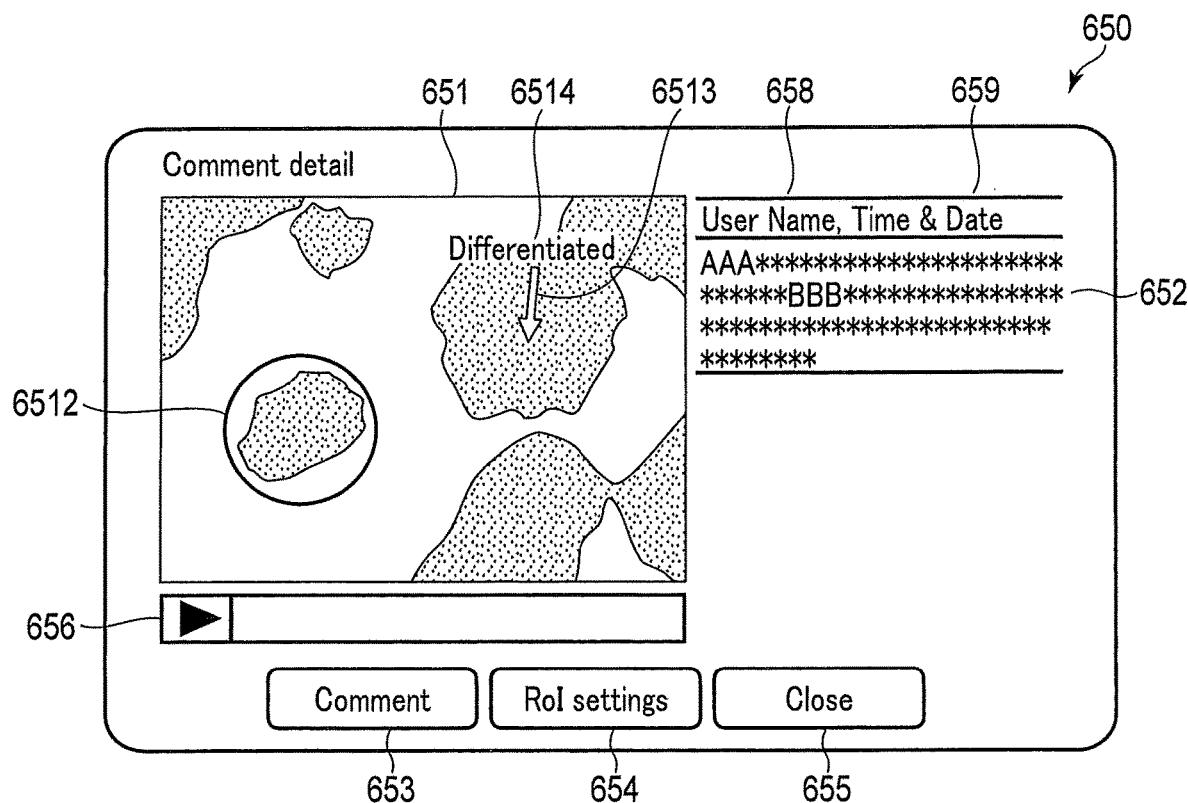
FIG. 17 is a diagram showing an outline of an example of a detailed comment screen to be displayed on the display.

In step S801, the calculating unit 210 causes the display to display a comment detail screen. An example of the comment detail screen is shown in FIG. 17. The comment detail screen 650 includes an image display area 651. The currently selected image is displayed in the image display area 651. On the image, the RoI and the like added to the image is displayed. That is, for example, a circle 6512, an arrow 6513, a text 6514 and the like are superimposed and displayed on the image. The comment detail screen 650 also includes a comment field 652, a user name display field 658 and a date and time display field 659. The full text of added text information is displayed in the comment field 652. The information of a user who registered comments, RoI, etc. is displayed in the user name display field 648. Date and time when the comments, RoI, etc. were registered is displayed in the date and time display field 649. The comment detail screen 650 further includes a comment icon 653, a RoI setting icon 654, a close icon 655 and a movie image playback icon 656.

The color of characters, figures and the like on the comment detail display screen 650 may vary depending on, for example, users who registered their comments and make it easy to recognize who made the comments. The users may be distinguished by fonts or the like as well as colors.

In step S802, the calculating unit 210 determines whether the comment icon 653 is selected. When the comment icon 653 is not selected, the process proceeds to step S804. On the other hand, when the comment icon 653 is selected, the process proceeds to step S803. In step S803, the calculating unit 210 performs a comment entry process in which a user enters comments in the newly displayed comment field. After that, the process proceeds to step S804.

In step S804, the calculating unit 210 determines whether the RoI setting icon 654 is selected. When the RoI setting icon 654 is not selected, the process proceeds to step S807. On the other hand, when the RoI setting icon 654 is selected, the process proceeds to step S805. In step S805, the calculating unit 210 performs a RoI setting process using the RoI setting screen 620, which is similar to the process described with reference to FIG. 10. In step S806, the calculating unit 210 determines whether the OK icon 623 of the RoI setting screen 620 is selected. When the OK icon 623 is not selected, the process returns to step S805 to continue the RoI setting process. When the OK icon 623 is selected, the RoI setting screen 620 is closed, and the process proceeds to step S807.

In step S807, the calculating unit 210 determines whether the movie image playback icon 656 is selected. When the movie image playback icon 656 is not selected, the process proceeds to step S809. On the other hand, when the movie image playback icon 656 is selected, the process proceeds to step S808. In step S808, the calculating unit 210 performs a movie image playback process of displaying images related to the currently selected image with comments, in the order of imaging.

Figure 18:
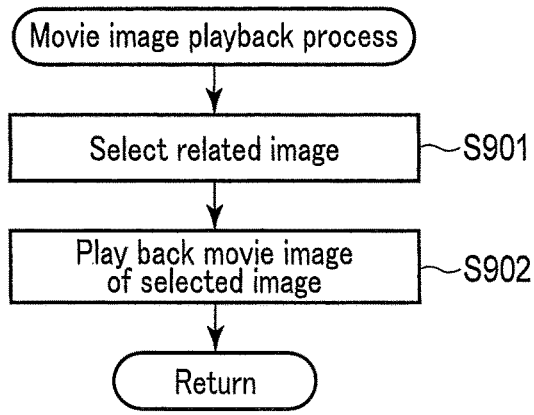
FIG. 18 is a flowchart showing an outline of an example of a movie image reproduction process to be performed in the observation system.

The movie image playback process will be described with reference to the flowchart shown in FIG. 18. In step S901, the calculating unit 210 selects an image related to the currently selected image with comments.

Figure 19:
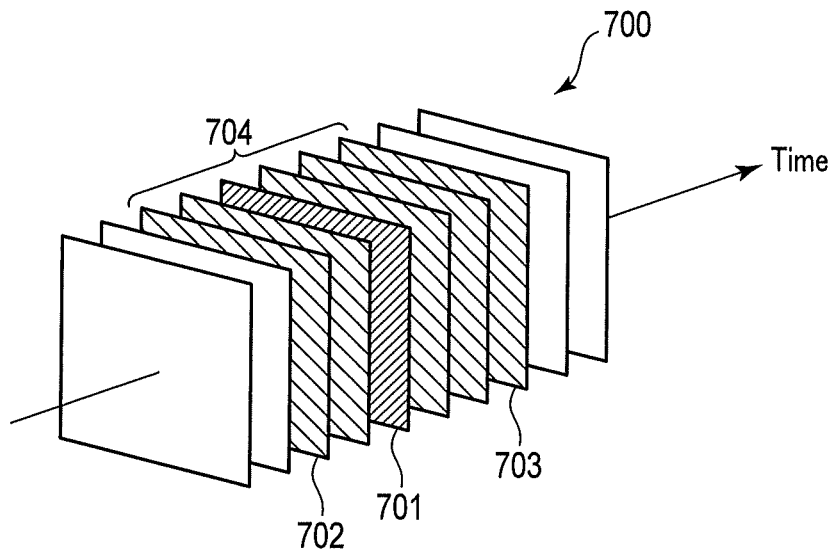
FIG. 19 is a diagram illustrating an example of related images to be selected in the observation system.

FIG. 19 schematically shows a plurality of images imaged over time. In FIG. 19, one square represents one image. Since a plurality of images are imaged in accordance with the set timing for one imaging position as described above, there is an image group 700 in time series. The observation time is generally long and thus a large number of images may be included in the image group. When imaging is performed, for example, every hour, 720 images are acquired in 30 days. In the present embodiment, a series of images associated with the currently selected image is selected from among the large number of images. For example, the currently selected image will be referred to as a selected image 701. At this time, an image acquired immediately after subculture work before the selected image 701 is selected as a start image 702. Further, an image acquired immediately before subculture work after the selected image 701 is selected as an end image 703. A series of images from the start image 702 to the end image 703 is selected as selected images 704. The start and end images 702 and 703 are not associated with the subculture work, but may be associated with culture medium change, associated with other works such as reagent addition, and selected by any other criterion associated with the observation. In addition, the start image 702 may be an image acquired at the beginning of a series of observations. The end image 703 may be the latest image acquired at the end of a series of observations. The start and end images 702 and 703 may be selected as appropriate according to the purpose.

In step S902, the calculating unit 210 causes the display to play back a movie image to display the selected images 704, which are selected in step S901, in time sequence. That is, the calculating unit 210 causes the display to play back a time-lapse movie image. The movie image playback process is terminated, and the process returns to the detail confirmation process. In the detail confirmation process, after the movie image playback process in step S808, the process proceeds to step S809.

In step S809, the calculating unit 210 determines whether the close icon 655 of the comment detail screen 650 is selected. When the close icon 655 is not selected, the process returns to step S802 to repeat the foregoing process. On the other hand, when the close icon 655 is selected, the process proceeds to step S810.

In step S810, the calculating unit 210 generates a comment file 361 based on the comments entered and set as described above, and records it in the observation data 300. At this time, information indicating a reply to the comments, information indicating the original comments, etc. are also recorded in the comment type 372 to be recorded in the comment file 361. In step S811, the calculating unit 210 records necessary information regarding the comments in the comments 348 of the image file 331 related to the corresponding image, the comments 397 of the analysis information 390, the comments 314 of the imaging information 310, and the like.

Thus, the detail confirmation process is terminated, and the process returns to the comment confirmation process described with reference to FIG. 14. After the detail confirmation process in step S705 of the comment confirmation process, the process proceeds to step S706.

In step S706, the calculating unit 210 determines whether the share icon 643 is selected. When the share icon 643 is not selected, the process proceeds to step S708. On the other hand, when the share icon 643 is selected, the process proceeds to step S707. In step S707, the calculating unit 210 performs a screen information transmission process. The screen information transmission process is a process of transmitting information regarding the same screen as the currently displayed screen to another user so that the user can see the screen. The screen information transmission process will be described with reference to the flowchart shown in FIG. 20.

The calculating unit 210 is so configured that it can specify a display screen by a URL. In step S1001, the calculating unit 210 creates a URL to specify the currently displayed screen. In step S1002, the calculating unit 210 selects a sharer with whom the screen should be shared, based on user's instructions. In step S1003, the calculating unit 210 causes a terminal operated by the user to start email software and start an email transmission screen. In step S1004, the calculating unit 210 attaches the email address of the sharer selected in step S1002 to the destination of the transmitted mail. In step S1005, the calculating unit 210 attaches the URL created in step S1001 to the contents of the transmitted mail.

The user adds a text and the like to the created email as appropriate, and transmits the email to the sharer using the email software. The sharer who has received the email can select the URL in the email and view the screen which the transmitter of the email desires to browse. Thus, the screen information transmission process is terminated, and the process returns to the comment confirmation process.

Here is a description of an example of a method for sharing information of a browsing screen using email has been, but email need not be used. For example, a screen to be browsed may be shared using a web browser, a dedicated information sharing application or the like.

The comment confirmation process shown in FIG. 14 will be described again. After the screen information transmission process in step S707, the process proceeds to step S708.

In step S708, the calculating unit 210 determines whether the user has instructed completion of the comment confirmation process, for example, by clicking an area other than the comment summary display screen 640. When the completion of the comment confirmation process is not instructed, the process returns to step S702 and repeats the foregoing process. On the other hand, when the completion of the comment confirmation process is instructed, the comment confirmation process is terminated, and the process returns to the observation data management process described with reference to FIG. 5.

Referring back to FIG. 5, the observation data management process will be described again. After the comment confirmation process in step S207, the process proceeds to step S208. In step S208, the calculating unit 210 determines whether a movie image playback is selected, such as selecting a playback icon 561 of the movie image operation icon 560. When the movie image playback is not selected, the process proceeds to step 210. On the other hand, when the movie image playback is selected, the process proceeds to step S209.

In step S209, the calculating unit 210 performs the movie image playback process described with reference to FIG. 18. That is, an image associated with the currently selected point of time is selected, and the selected image is played back as a time-lapse movie image. For example, when a plurality of thumbnail images are displayed side by side in the image display area 510 as shown in FIG. 6, the thumbnail images are switched in sequence as a time-lapse movie images. After the movie image playback process, the process proceeds to step S210.

In step S210, the calculating unit 210 determines whether time is selected on the time bar 550. When no time is selected, the process proceeds to step S212. On the other hand, when time is selected, the process proceeds to step S211.

In step S211, the calculating unit 210 updates the image displayed in the image display area 510 according to the selected time. That is, it causes the image acquired at the selected time to be displayed in the image display area 510. After that, the process proceeds to step S212.

In step S212, the calculating unit 210 determines whether the share icon 582 in the main screen 500 is selected. When the share icon 582 is not selected, the process proceeds to step S214. On the other hand, when the share icon 582 is selected, the process proceeds to step S213.

Figure 20:
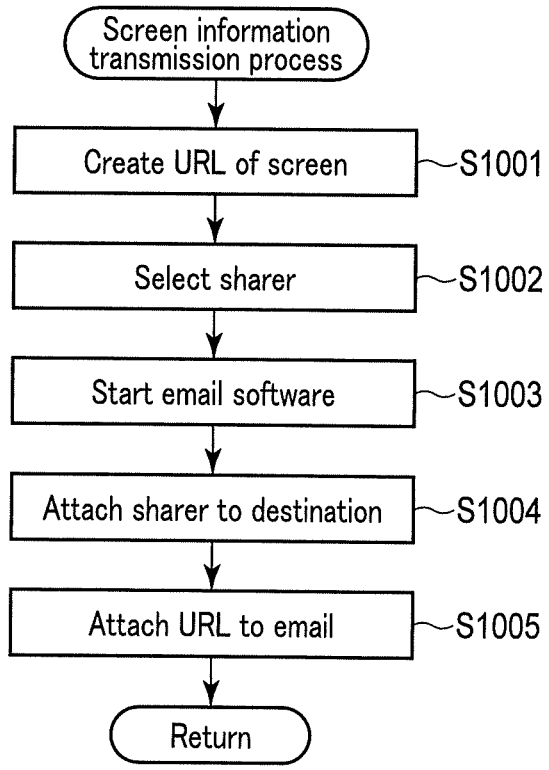
FIG. 20 is a flowchart showing an outline of an example of a screen information transmission process to be performed in the observation system.

In step S213, the calculating unit 210 performs the screen information transmission process described with reference to FIG. 20. That is, the calculating unit 210 performs a process related to transmitting the URL representing the currently displayed screen to the user selected sharer, for example, by email. After the screen information transmission process, the process proceeds to step S214.

In step S214, the calculating unit 210 determines whether the comment list icon 584 of the main screen 500 is selected. When the comment list icon 584 is not selected, the process proceeds to step S216. On the other hand, when the comment list icon 584 is selected, the process proceeds to step S215. In step S215, the calculating unit 210 performs a comment list process.

Figure 21:
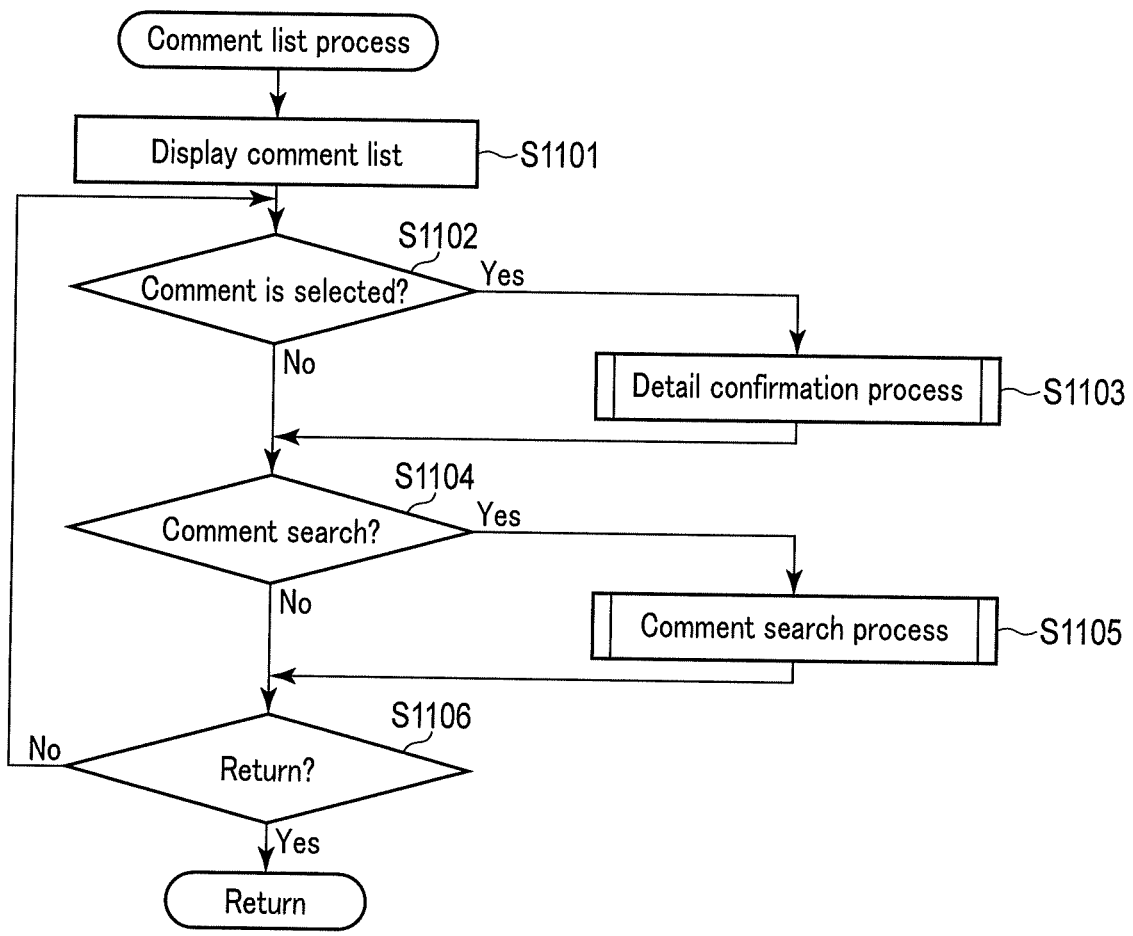
FIG. 21 is a flowchart showing an outline of an example of a comment list process to be performed in the observation system.

The comment list process will be described with reference to the flowchart shown in FIG. 21.

In step S1101, the calculating unit 210 causes the display to display a comment list. The comment list displays a list of comments of the comment file 361 included in the observation data 300. In addition, the comment list may be displayed, for example, in different display colors or in different character colors so that a comment already confirmed by a user who is viewing the comment can be distinguished from an unconfirmed comment.

In step S1102, the calculating unit 210 determines whether any comment in the comment list is selected. When no comments are selected, the process proceeds to step S1104. On the other hand, when a comment is selected, the process proceeds to step S1103. In step S1103, the calculating unit 210 performs the detail confirmation process described with reference to FIG. 16. That is, with respect to the selected comment, for example, the comment detail screen 650 shown in FIG. 17 is displayed on the display, the details of the comment are browsed, and various types of processes regarding the comment are performed. After the detail confirmation process, the process proceeds to step S1104.

In step S1104, the calculating unit 210 determines whether a comment search instruction is provided. When no comment search instruction is provided, the process proceeds to step S1106. On the other hand, when a comment search instruction is provided, the process proceeds to step S1105. In step S1105, the calculating unit 210 performs a comment search process. That is, the calculating unit 210 selects a corresponding comment from the comment file 361 included in the comment file group 360 on the basis of a user input keyword included in the comment, the imaging time of an image with comments, user's information with comments, and time when comments are registered, and the like. The calculating unit 210 causes the display to display a list of corresponding comments and causes the comment detail screen 650 to display the comments selected by the user. After the comment search process, the process proceeds to step S1106.

In step S1106, the calculating unit 210 terminates the comment list process and determines whether the process should return to the observation data management process. When the comment list process is not terminated, the process returns to step S1102, and the above process is repeated. On the other hand, when the comment list process is terminated, the process returns to the observation data management process.

After the comment list process in step S215 of the observation data management process shown in FIG. 5, the process proceeds to step S216. In step S216, the calculating unit 210 determines whether the logout icon 586 is selected. When the logout icon 586 is not selected, the process returns to step S202, and the foregoing process is repeated. On the other hand, when the logout icon 586 is selected, the observation data management process is terminated.

[Advantages of Observation System]

Some of the advantages of the observation system 1 according to the present embodiment will be described. In the observation system 1 according to the present embodiment, a user can add comments regarding a region of interest, a point of time, contents, judgment, an opinion, etc., to an image acquired by the observation device 110, an analysis result obtained based on the image, and the like. According to the observation system 1, the comments are recorded in association with the fact such as the image and analysis result. The comments are therefore organized and recorded in an appropriate and meaningful manner. Further, the time and effort involved in this recording is less than that in a conventional method such as recording in a notebook. Cell culture may be performed for periods as long as several weeks, for example. When images are imaged repeatedly or comments are recorded over a long period of time, the number of images and comments becomes large. The observation system 1 according to the present embodiment makes it possible for a user to save the time and effort for recording and for organizing the records. The observation system 1 also makes it easy for a user to browse the images and comments because they are organized and displayed.

According to the observation system 1, the comments can be browsed by a user other than the user who added the comments. Thus, the added comments can easily be shared among a large number of users. Since the comments are recorded chronologically in an appropriately organized manner, even a user who is not performing a culture operation can confirm the comments while checking the culture process. Whether the added comments are based on the culture process or based on the subjective point of the user who added the comments, other users easily grasp the contents of the comments.

Since, in the observation system 1, a user can add further comments in association with comments added by others, communications such as report, consultation, discussion, and instruction regarding cultured cells can smoothly be carried out. Thus, the observation system 1 makes it possible to record comments which were exchanged orally and were difficult to record, in an appropriately organized manner. According to the observation system 1, the communications can be carried out without making the place and time the same.

In the observation system 1, in the time-lapse movie image playback in which a plurality of images are continuously displayed, only an image related to, for example, comments or the like is selected from a large number of stored images and then played back. The user can thus grasp the states of cultured cells more accurately and save time and effort for browsing unnecessary information.

The foregoing embodiment is directed to an example in which the server 200 performs the observation data management process, but the present embodiment is not limited to the example. For example, the controller 130 is not connected to a network, and the controller 130 may perform a series of observation data management processes described above.

Some of the data items and processes described in the foregoing embodiment may be deleted or others may be added. In the observation data 300, for example, the imaging position, imaging time, specific information, comments and the like are held redundantly, but some of them may be omitted. Further, for example, the observation data management process shown in FIG. 5 is directed to an example including various processes, but some of the processes may be deleted, other processes may be added, and the order of the processes may be changed as appropriate.

In addition, technologies related to artificial intelligence may be utilized for the foregoing processes and various judgments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. An observation system comprising a processor configured to:
   manage a plurality of images imaged at different positions of a biological sample being cultured, the images being acquired in time series;
   manage record of work performed while the biological sample is being cultured;
   record a first comment and a first region of interest (RoI) in a storage device in association with the plurality of images based on user's instructions;
   associate the record of work with the plurality of images; and
   cause a display to display:
      a time bar indicating the time series;
      a selected time display on the time bar, which indicates a point of time selected in the time series;
      images selected from the plurality of images and imaged at the different positions of the biological sample at timing that is considered to be equal to the selected point of time; and
      an icon with comments displayed in association with the images when there is the first comment recorded in association with the images.

2. The observation system according to claim 1, wherein the processor is configured to:
   record a second comment and a second RoI in the storage device in association with the first comment based on user's instructions;
   cause the display to display the first comment and the first RoI stored in association with the plurality of images, the second comment and the second RoI stored in association with the first comment and the record of work associated with the plurality of images;
   manage an analysis result obtained based on the images; and
   record a third comment in association with the analysis result based on user's instructions.

3. The observation system according to claim 2, wherein the processor is configured to associate the first comment, the second comment and the third comment with one another.

4. The observation system according to claim 2, wherein the processor is configured to:
   cause the display to display a graph indicating the analysis result along the time series and a selected time display indicating a point of time selected in the time series; and
   record the third comment in the storage device in association with the analysis result corresponding to the point of time selected.

5. The observation system according to claim 2, wherein the processor is configured to cause the display to display a graph indicating the analysis result along the time series and an icon with comments displayed in association with the analysis result when there is the third comment recorded in association with the analysis result.

6. The observation system according to claim 5, wherein the processor is configured to cause the display to display contents of the third comment when the icon with comments is selected.

7. The observation system according to claim 1, wherein the processor is configured to attach a comment indicator indicating a point of time when the first comment and the second comment are attached, to a time bar indicating a time series, and cause the display to display the time bar.

8. The observation system according to claim 1, wherein the processor is configured to:
   record a second comment and a second RoI in the storage device in association with the first comment based on user's instructions;
   record information to specify a user who has instructed recording of the first comment, in association with the first comment, and record information to specify a user who has instructed recording of the second comment, in association with the second comment; and
   cause the display to display the first comment and the first RoI stored in association with the plurality of images, the second comment and the second RoI stored in association with the first comment and the record of work associated with the plurality of images.

9. The observation system according to claim 8, wherein the processor is configured to cause the display to display the first comment and the second comment in different colors.

10. The observation system according to claim 1, wherein the processor is configured to:
    record a second comment and a second RoI in the storage device in association with the first comment based on user's instructions;
    select some of the plurality of images based on the record of work and a user's selected comment of the first comment and the second comment; and
    cause the display to display the some of the plurality of images continuously in sequence.

11. The observation system according to claim 1, comprising a plurality of terminals configured to access the plurality of images managed by the processor, the first comment and the second comment.

12. The observation system according to claim 11, wherein the processor is configured to transmit images designated by a first terminal of the terminals and information specifying the first comment and the second comment, to a second terminal of the terminals, based on an instruction of the first terminal.

13. The observation system according to claim 1, wherein the processor is configured to record the first comment in the storage device in association with the image corresponding to the selected point of time.

14. The observation system according to claim 1, wherein the processor is configured to cause the display to display:
   a container map indicating the different positions of the biological sample at which imaging is performed;

a highlight display indicating an image of the images, which corresponds to a position selected in the container map; and record the first comment in the storage device in association with an image corresponding to the selected position.

15. The observation system according to claim 1, wherein the processor is configured to cause the display to display contents of the first comment when the icon with comments is selected.

16. An information management method comprising:

managing a plurality of images imaged at different positions of a biological sample being cultured, the images being acquired in time series;

managing record of work performed while the biological sample is being cultured;

recording a first comment and a first region of interest (RoI) in a storage device in association with the plurality of images based on user's instructions;

associating the record of work with the plurality of images; and causing a display to display:
　a time bar indicating the time series;
　a selected time display on the time bar, which indicates a point of time selected in the time series;
　images selected from the plurality of images and imaged at the different positions of the biological sample at timing that is considered to be equal to the selected point of time; and
　an icon with comments displayed in association with the images when there is the first comment recorded in association with the images.

17. A non-transitory computer-readable storage medium that stores a program that causes a processor to at least perform:

manage a plurality of images imaged at different positions of a biological sample being cultured, the images being acquired in time series;

manage record of work performed while the biological sample is being cultured;

record a first comment and a first region of interest (RoI) in a storage device in association with the plurality of images based on user's instructions;

associate the record of work with the plurality of images; and cause a display to display:
　a time bar indicating the time series;
　a selected time display on the time bar, which indicates a point of time selected in the time series;
　images selected from the plurality of images and imaged at the different positions of the biological sample at timing that is considered to be equal to the selected point of time; and
　an icon with comments displayed in association with the images when there is the first comment recorded in association with the images.

18. An observation system comprising a processor configured to:

manage a plurality of images acquired in time series with respect to a biological sample which is being cultured;

manage an analysis result obtained based on the images;

manage record of work performed while the biological sample is being cultured;

record a first comment and a first region of interest (RoI) in a storage device in association with the plurality of images based on user's instructions;

record a second comment and a second RoI in the storage device in association with the first comment based on user's instructions;

record a third comment in association with the analysis result based on user's instructions;

associate the record of work with the plurality of images based on the record of work;

cause a display to display the first comment and the first RoI stored in association with the plurality of images, the second comment and the second RoI stored in association with the first comment and the record of work associated with the plurality of images;

cause the display to display a graph indicating the analysis result along the time series and a selected time display indicating a point of time selected in the time series; and record the third comment in the storage device in association with the analysis result corresponding to the point of time selected.

* * * * *